(12) United States Patent
Kuo et al.

(10) Patent No.: US 12,111,513 B2
(45) Date of Patent: Oct. 8, 2024

(54) OPTICAL LENS AND HEAD-MOUNTED DISPLAY DEVICE

(71) Applicant: Coretronic Corporation, Hsin-Chu (TW)

(72) Inventors: Tao-Hung Kuo, Hsin-Chu (TW); Fu-Ming Chuang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 496 days.

(21) Appl. No.: 16/901,000

(22) Filed: Jun. 15, 2020

(65) Prior Publication Data
US 2020/0409034 A1    Dec. 31, 2020

Related U.S. Application Data

(60) Provisional application No. 62/866,634, filed on Jun. 26, 2019.

(30) Foreign Application Priority Data

Mar. 9, 2020 (CN) .......................... 202010155853.8

(51) Int. Cl.
*G02B 9/34* (2006.01)
*F21V 8/00* (2006.01)
(Continued)

(52) U.S. Cl.
CPC ............. *G02B 9/34* (2013.01); *G02B 6/0025* (2013.01); *G02B 6/0036* (2013.01);
(Continued)

(58) Field of Classification Search
CPC ...... G02B 9/34; G02B 6/0025; G02B 6/0036; G02B 13/004; G02B 13/18; G02B 27/0172; G02B 13/16; G02B 25/001; G02B 13/06
See application file for complete search history.

(56) References Cited

U.S. PATENT DOCUMENTS 5,742,434 A    4/1998   Carmeli
8,587,869 B2   11/2013  Totani et al.
(Continued)

FOREIGN PATENT DOCUMENTS

CN    109932806    6/2019
DE    19931949     1/2001
(Continued)

OTHER PUBLICATIONS

Machine Translation of WO 2019054358 A1 (Year: 2019).*
(Continued)

*Primary Examiner* — Darryl J Collins
*Assistant Examiner* — Matthew Y Lee
(74) *Attorney, Agent, or Firm* — JCIPRNET

(57) ABSTRACT

An optical lens and a head-mounted display device are provided. The optical lens includes a first lens, a second lens, a third lens, and a fourth lens sequentially arranged from a light exit side to a light incident side. Refractive powers of the first lens, the second lens, the third lens and the fourth lens are sequentially positive, negative, positive and positive. An image generator is disposed at the light incident side. The optical lens is configured to receive an image beam provided by the image generator. The image beam forms a stop at the light exit side. The stop has the minimum cross-sectional area of beam convergence of the image beam. The optical lens and the head-mounted display device of the disclosure have advantages of smaller size, light weight, large viewing angle and high resolution.

21 Claims, 25 Drawing Sheets

(51) Int. Cl.
   *G02B 13/00*    (2006.01)
   *G02B 13/18*    (2006.01)
   *G02B 27/01*    (2006.01)

(52) U.S. Cl.
   CPC ........... *G02B 13/004* (2013.01); *G02B 13/18* (2013.01); *G02B 27/0172* (2013.01)

(56) References Cited

U.S. PATENT DOCUMENTS

| | | | |
|---|---|---|---|
| 2004/0108971 A1 | 6/2004 | Waldern et al. | |
| 2012/0099014 A1* | 4/2012 | Huang | G02B 13/004 348/340 |
| 2014/0043690 A1* | 2/2014 | Yamamoto | G02B 13/18 359/650 |
| 2019/0025558 A1* | 1/2019 | Chen | G02B 13/22 |
| 2019/0064527 A1 | 2/2019 | Kuo et al. | |
| 2019/0187353 A1 | 6/2019 | Kuo et al. | |
| 2020/0150405 A1* | 5/2020 | Bates | G02B 13/16 |
| 2020/0379158 A1* | 12/2020 | Blomstedt | G02B 27/0012 |
| 2021/0239981 A1* | 8/2021 | Liu | G02B 25/001 |

FOREIGN PATENT DOCUMENTS

| | | | | |
|---|---|---|---|---|
| JP | H01319724 | 12/1989 | | |
| JP | 2004341013 | 12/2004 | | |
| JP | 2005165032 | 6/2005 | | |
| KR | 20160002690 U | * | 8/2016 | ............ G02B 13/00 |
| TW | M390465 | 10/2010 | | |
| WO | 2009117870 | 10/2009 | | |
| WO | 2018117025 | 6/2018 | | |
| WO | 2018220265 | 12/2018 | | |
| WO | WO-2019054358 A1 | * | 3/2019 | ............ G02B 25/00 |

OTHER PUBLICATIONS

Machine translation of KR 20160002690 U (Year: 2016).*
"Search Report of Europe Counterpart Application", issued on Nov. 19, 2020, p. 1-p. 8.
"Office Action of Taiwan Counterpart Application", issued on Nov. 2, 2020, p. 1-p. 5.
Office Action of China Counterpart Application, issued on Jan. 5, 2022, pp. 1-8.
"Office Action of Japan Counterpart Application", issued on May 30, 2023, p. 1-p. 6.
"Office Action of Europe Counterpart Application", issued on Jun. 28, 2023, p. 1-p. 6.

* cited by examiner

OPTICAL LENS AND HEAD-MOUNTED DISPLAY DEVICE

CROSS-REFERENCE TO RELATED APPLICATION

This application claims the priority benefit of U.S. provisional application Ser. No. 62/866,634, filed on Jun. 26, 2019 and China application serial no. 202010155853.8, filed on Mar. 9, 2020. The entirety of the above-mentioned patent application is hereby incorporated by reference herein and made a part of this specification.

BACKGROUND

Technical Field

The disclosure relates to an optical lens, and particularly relates to an optical lens adapted to a head-mounted display device.

Description of Related Art

Displays with waveguides (waveguide displays) may be divided into a self-luminous panel framework, a transmissive panel framework, and a reflective panel framework according to different types of image sources thereof. In a waveguide display of the self-luminous or transmissive panel framework, an image beam provided by each of the above various forms of panels passes through an optical lens and enters a waveguide through a coupling entrance. Then, the image beam is transmitted to a coupling exit in the waveguide, and then the image beam is projected to a position of a human eye to form an image. In a waveguide display of the reflective panel framework, after an illumination light beam provided by a light source is transmitted by the illumination optical device, the illumination light beam irradiates a reflective panel through an illumination prism, the reflective panel converts the illumination light beam into an image beam, and the reflective panel transmits the image beam to an optical lens, and the image beam is guided into a waveguide through the optical lens. Then, the image beam is transmitted to a coupling exit in the waveguide, and then the image beam is projected to the position of the human eye. An image generated by an image source (the panel) may be processed by the optical lens to form a virtual image at a certain distance, and the virtual image is imaged on a retina through the human eye. Optical lenses are used in waveguide displays, and sizes and weights of the optical lenses are important issues to be considered in design.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure is directed to an optical lens, which has a small size, a light weight, a large viewing angle, and high resolution.

Other objects and advantages of the disclosure may be further illustrated by the technical features broadly embodied and described as follows. In order to achieve one or a portion of or all of the objects or other objects, an embodiment of the disclosure provides an optical lens, and the optical lens includes a first lens, a second lens, a third lens, and a fourth lens sequentially arranged from a light exit side to a light incident side. Refractive powers of the first lens, the second lens, the third lens, and the fourth lens are sequentially positive, negative, positive, and positive. An image generator is disposed at the light incident side. The optical lens is configured to receive an image beam provided by the image generator. The image beam forms a stop at the light exit side. The stop has the minimum cross-sectional area of beam convergence of the image beam.

In order to achieve one or a portion of or all of the objects or other objects, another embodiment of the disclosure provides a head-mounted display device including an optical lens and a waveguide element. The optical lens includes a first lens, a second lens, a third lens, and a fourth lens sequentially arranged from a light exit side to a light incident side. Refractive powers of the first lens, the second lens, the third lens, and the fourth lens are sequentially positive, negative, positive, and positive. An image generator is set at the light incident side. The optical lens is configured to receive an image beam provided by the image generator. The image beam forms a stop at the light exit side. The stop has the minimum cross-sectional area of beam convergence of the image beam. The stop is formed at a coupling entrance of the waveguide element. The image beam passes through the stop to enter the waveguide element through the coupling entrance, and is transmitted to a coupling exit of the waveguide element for being projected to a target.

Based on the above description, the embodiments of the disclosure have at least one of following advantages or effects. In the exemplary embodiments of the disclosure, the design of the optical lens is complied with a preset specification, and an overall length of the optical lens is shortened, thereby reducing an appearance volume of the display. In addition, considering a material of the lenses in the optical lens, a weight of the optical lens is reduced, thereby reducing a weight of the head-mounted display. In addition, a problem that a volume and a weight of the display become larger and heavier due to that the design of the optical lens becomes more complex when a field of view (FOV) of the waveguide becomes larger is avoided. Therefore, the optical lens of the disclosure has the advantages of small size, light weight, large viewing angle, and high resolution. It should be noted that when the head-mounted display is used, heat is generated to cause deformation of the optical lens, thereby affecting the image quality. However, by using the design of the optical lens of the disclosure, a problem of thermal drift is effectively resolved to improve the image quality.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

In the following detailed description of the preferred embodiments, reference is made to the accompanying drawings which form a part hereof, and in which are shown by way of illustration specific embodiments in which the disclosure may be practiced. In this regard, directional terminology, such as "top," "bottom," "front," "back," etc., is used with reference to the orientation of the Figure(s) being described. The components of the present disclosure can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
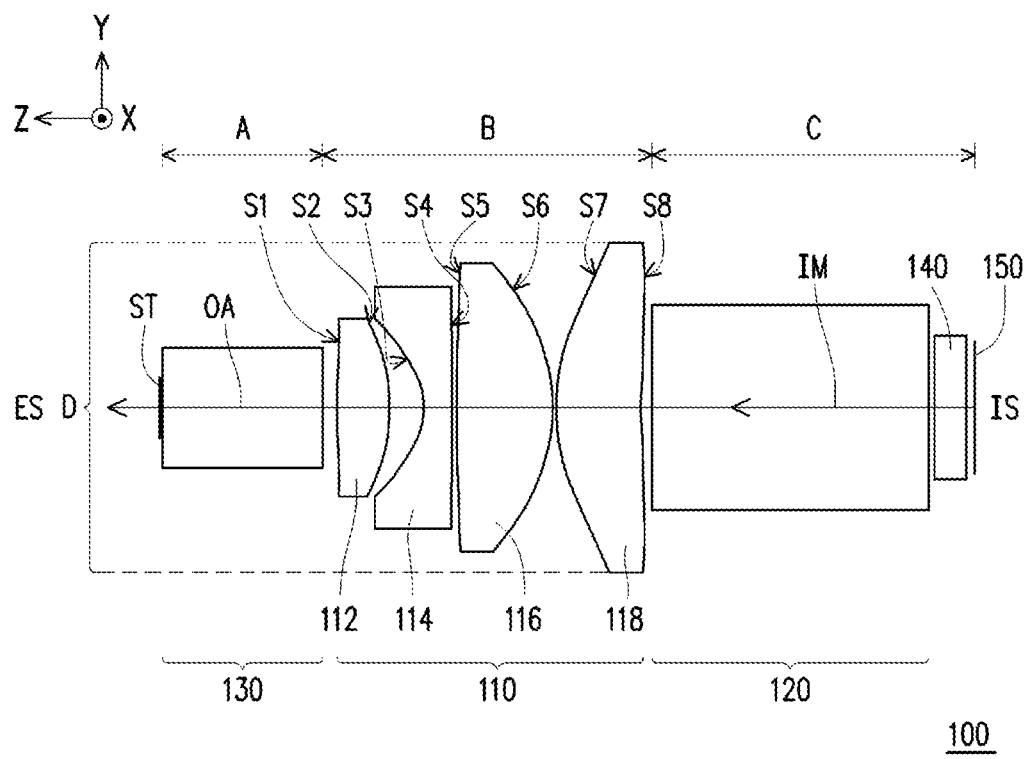
FIG. 1 is a schematic diagram of a head-mounted display device according to a first embodiment of the disclosure.

FIG. 1 is a schematic diagram of a head-mounted display device according to a first embodiment of the disclosure. Referring to FIG. 1, a head-mounted display device 100 of the embodiment may have a waveguide element 130, but the disclosure is not limited thereto. In the embodiment, the head-mounted display device 100 includes an optical lens 110, a transmission prism (a second prism) 120, the waveguide element 130 and an image generator 150. The image generator 150 is disposed at a light incident side IS of the optical lens 110. The image generator 150 may be an image display device such as a digital micro-mirror device (DMD) or liquid crystal on silicon (LCoS), etc., in other embodiments, the image generator 150 may be a transmissive spatial light modulator, such as a transparent liquid crystal panel, etc. The image generator 150 may also be an organic light-emitting diode (OLED), a micro organic light-emitting diode (micro OLED), or a micro light-emitting diode (micro LED). The pattern or type of the image generator 150 is not limited by the disclosure. The transmission prism (the second prism) 120 is disposed between the optical lens 110 and the image generator 150. An image beam IM provided by the image generator 150 passes through the transmission prism 120 to enter the optical lens 110. The optical lens 110 is adapted to receive the image beam IM. In the embodiment, a cover glass 140 is disposed between the image generator 150 and the transmission prism 120 to prevent dust from accumulating on a surface of the image generator 150 and affecting transmission of the image beam IM to cause unclear images.

In the embodiment, the image beam IM forms a stop ST at a light exit side ES of the optical lens 110 after passing through the optical lens 110. In the embodiment, the stop ST is formed at the light exit side ES of the image beam IM. The stop ST has the minimum cross-sectional area of the image beam IM. For example, in the embodiment, the stop ST is, for example, a circle on a reference plane formed by an X-axis and a Y-axis, and diameters of the stop ST in the X-axis direction and in the Y-axis direction are the same. In the embodiment, the image beam IM forms the stop ST after passing through the optical lens 110. The stop ST has the minimum cross-sectional area of the image beam IM. Therefore, the image beam IM is converged to the stop ST after passing through the optical lens 110 and is diverged after passing through the stop ST. In the embodiment, the image beam IM is transmitted to a coupling exit of the waveguide element 130, where the stop ST is located at the coupling exit of the waveguide element 130, and then the image beam IM is projected to a default target. In an embodiment, the default target is, for example, a human eye. In other embodiments, the stop ST may be located at a light entrance of the waveguide element 130 or any position within the waveguide element 130, and the image beam IM is transmitted to the coupling exit by the waveguide element 130 and is then projected to the default target. The light incident side IS is a side where the image beam IM enters the optical lens 110, and the light exit side ES is a side where the image beam IM leaves the optical lens 110.

In the embodiment, one of a plurality of cases is that the optical lens 110 is complied with B×D<130, where B is a total lens length of the optical lens 110, and in the embodiment, B is, for example, a distance from a surface S1 to a surface S8 on an optical axis OA, and D is a clear aperture of the largest lens in the optical lens 110, and in the embodiment, D is, for example, a clear aperture of a fourth lens 118. In the embodiment, another case is that the optical lens 110 is complied with A+C<20, where A is a distance between the stop ST and the surface S1 of the optical lens 110 on the optical axis OA, i.e. a distance between the stop ST and a light exit surface of a first lens 112, and C is a distance between the surface S8 of the optical lens 110 and a surface of the image generator 150 on the optical axis OA. In the embodiment, a further case is that the optical lens 110 is complied with FOV/(B×D)>0.4, where FOV is a field of view of the optical lens 110. In the embodiment, a still another case is that the optical lens 110 is complied with FOV>50. In the embodiment, a yet another case is that the optical lens 110 is complied with B×D<130, A+C<20, FOV/(B×D)>0.4, and FOV>50 at the same time. Definitions of the above parameters A, B, C, D, FOV are the same as that described above. In the embodiment, the above parameters A, B, C, and D are, for example, respectively 5.8 mm, 10.85 mm, 11.45 mm, and 11.7 mm. The values of these parameters are for illustrative purposes only and are not intended to be limiting the disclosure. In the embodiment, the field of view of the optical lens 110 is, for example, 60 degrees.

It should be noted that A+C represents a distance value of a front focal length plus a back focal length, where the front focal length is a focal length distance of the optical lens 110 on the light exit side, and the back focal length is a focal length distance of the optical lens 110 on the light incident side IS. The optical lens 110 is a telecentric optical lens design. Therefore, when the value of A+C is greater than 20 mm, it is quite difficult to consider a wide-angle (a field of view) design of the optical lens in the design of the telecentric optical lens, so that the value of A+C is maintained to be less than 20 mm to overcome the above mentioned disadvantage. B×D represents the cross-sectional area of the optical lens. Those skilled in the art know that it is more difficult to design smaller optical lenses. When the value of B is too large, the wide-angle of the optical lens cannot be taken into consideration in the design of the optical lens, so that the value of B needs to be controlled to achieve B×D<130, and therefore the optical lens of the embodiment has advantages of small size and large wide-angle. Similarly, FOV/(B×D)>0.4 represents a field of view per unit cross-sectional area, and FOV>50 represents that the field of view is maintained to be above 50 degrees.

In the embodiment, the optical lens 110 includes a first lens 112, a second lens 114, a third lens 116, and a fourth lens 118 sequentially arranged from the light exit side ES to the light incident side IS. Refractive powers of the first lens 112, the second lens 114, the third lens 116, and the fourth lens 118 are sequentially positive, negative, positive, and positive. In the embodiment, the first lens 112 is, for example, a biconvex lens, the second lens 114 is, for example, a convexo-concave lens and has a convex surface facing the light incident side IS, the third lens 116 is, for example, a biconvex lens, and the fourth lens 118 is, for example, a concavo-convex lens and has a concave surface facing the light incident side IS. In the embodiment, the first lens 112, the second lens 114, the third lens 116, and the fourth lens 118 may be glass aspherical lenses, the convexo-concave lens and the concavo-convex lens are, for example, meniscus lenses, and a difference there between is that facing directions of the convex surfaces thereof are different.

An embodiment of the optical lens 110 is provided below. It should be noted that the data listed below is not intended to be limiting the disclosure, and any person skilled in the art may make appropriate changes to the parameters or settings after referring to the disclosure, which are still considered to be within a scope of the disclosure.

TABLE 1

| Element | Surface | Curvature (1/mm) | Space (mm) | Refractive index | Abbe number |
|---|---|---|---|---|---|
| First lens 112 | S1 | 0.03 | 1.88 | 2.0 | 19 |
|  | S2 | −0.15 | 1.25 |  |  |
| Second lens 114 | S3 | −0.48 | 1.00 | 2.0 | 19 |
|  | S4 | −0.04 | 0.10 |  |  |
| Third lens 116 | S5 | 0.04 | 3.48 | 1.77 | 50 |
|  | S6 | −0.17 | 0.10 |  |  |
| Fourth lens 118 | S7 | 0.15 | 3.04 | 1.77 | 50 |
|  | S8 | 0.02 | 0.35 |  |  |

Referring to FIG. 1 and the Table 1, surfaces of each of the lenses (including the first lens 112 to the fourth lens 118) are listed in the Table 1. For example, the surface S1 is a surface of the first lens 112 facing the light exit side ES, and the surface S2 is a surface of the first lens 112 facing the light incident side IS, and the others may be deduced by analogy. Moreover, the space refers to a straight line distance between two adjacent surfaces on the optical axis OA. For example, the space corresponding to the surface S1 represents a straight line distance from the surface S1 to the surface S2 on the optical axis OA, and the space corresponding to the surface S2 represents a straight line distance from the surface S2 to the surface S3 on the optical axis OA, and the others may be deduced by analogy.

In the embodiment, the first lens 112, the second lens 114, the third lens 116, and the fourth lens 118 may be aspherical lenses. An equation of the aspherical lens is as follows:

$$X = \frac{Y^2}{R(1 + \sqrt{1 - (1+k)*Y^2/R^2})} + A_2Y^2 + A_4Y^4 + A_6Y^6 + A_8Y^8 + A_{10}Y^{10} + A_{12}Y^{12} \ldots$$

In the above equation, X is a sag in a direction of the optical axis OA, and R is a radius of an osculating sphere, i.e., a radius of curvature near the optical axis OA (a reciprocal of the curvature listed in the Table 1). k is a conic coefficient, Y is an aspheric height, i.e., a height from a lens center to a lens edge, and coefficients $A_2$, $A_4$, $A_6$, $A_8$, $A_{10}$, $A_{12}$ are aspheric coefficients. In the embodiment, the coefficient $A_2$ is 0. The following Table 2 lists parameter values of the surfaces of each of the lenses.

higher effective spatial utilization rate. Referring to FIG. 2B to FIG. 2D, in the embodiment, the maximum image height formed on the active surface of the image generator 150 is 4.09 mm, the design of the optical lens 110 is complied with a preset specification, and the optical lens 110 may analyze images with a resolution of at least 93 lp/mm. Therefore, the optical lens 110 has a small size, a light weight, a large viewing angle and high resolution.

Figure 3:
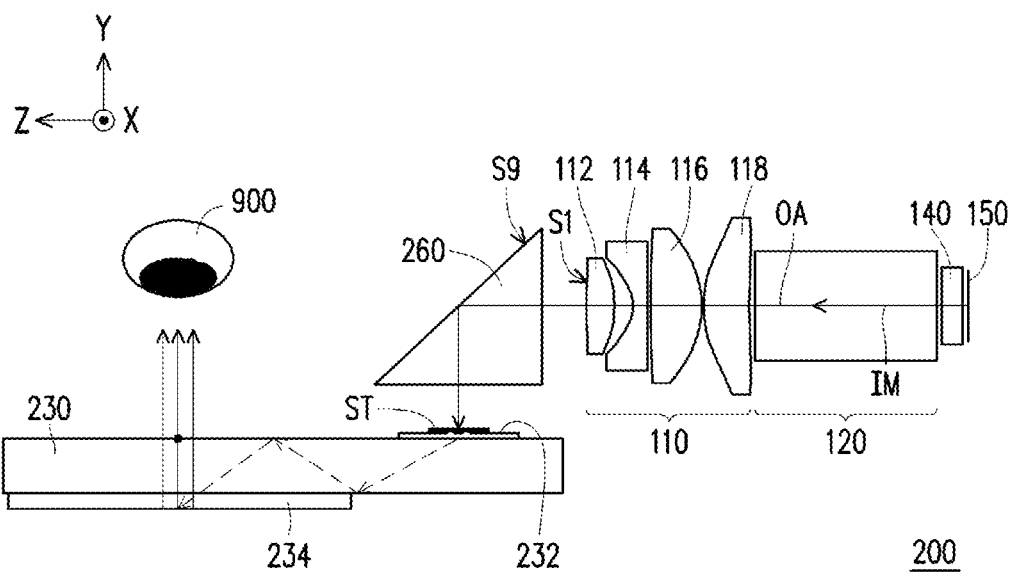
FIG. 3 is a schematic diagram of a head-mounted display device according to a second embodiment of the disclosure.

FIG. 3 is a schematic diagram of a head-mounted display device according to a second embodiment of the disclosure. Referring to FIG. 3, a head-mounted display device 200 of the embodiment is similar to the head-mounted display device 100 of FIG. 1, and a main difference there between is that the head-mounted display device 200 further includes a turning prism 260 (a first prism) and a waveguide element 230. In the embodiment, the turning prism 260 is disposed between the optical lens 110 and the stop ST. The image beam IM leaves the optical lens 110, and changes a transmitting direction after passing through the turning prism 260, and is converged to the stop ST. The image beam IM is diverged after passing through the stop ST. In the embodiment, the waveguide element 230 includes a coupling entrance 232 and a coupling exit 234. The coupling entrance

TABLE 2

|     | S1       | S2       | S3        | S4        | S5        | S6        | S7        | S8        |
|-----|----------|----------|-----------|-----------|-----------|-----------|-----------|-----------|
| k   | 0        | 0        | −6.94E−01 | 0         | 0         | 0         | 0         | 0         |
| A4  | −4.17E−04| 9.42E−04 | 1.91E−02  | 3.63E−03  | −6.94E−04 | 9.74E−04  | −8.97E−04 | 2.89E−04  |
| A6  | −4.42E−04| −4.72E−04| −1.15E−03 | −2.65E−04 | 1.74E−05  | 8.79E−07  | −5.07E−06 | −4.55E−05 |
| A8  | 9.09E−05 | 6.60E−05 | 6.07E−05  | 6.43E−06  | −1.73E−06 | −1.08E−06 | −8.38E−08 | 2.02E−06  |
| A10 | −8.16E−06| −4.58E−06| −2.32E−06 | 5.19E−08  | 1.09E−07  | 4.82E−08  | 8.57E−09  | −4.47E−08 |
| A12 | 2.81E−07 | 1.30E−07 | 1.88E−07  | −3.29E−09 | −2.04E−09 | −1.66E−10 | −2.83E−10 | 3.39E−10  |

Figure 2A:
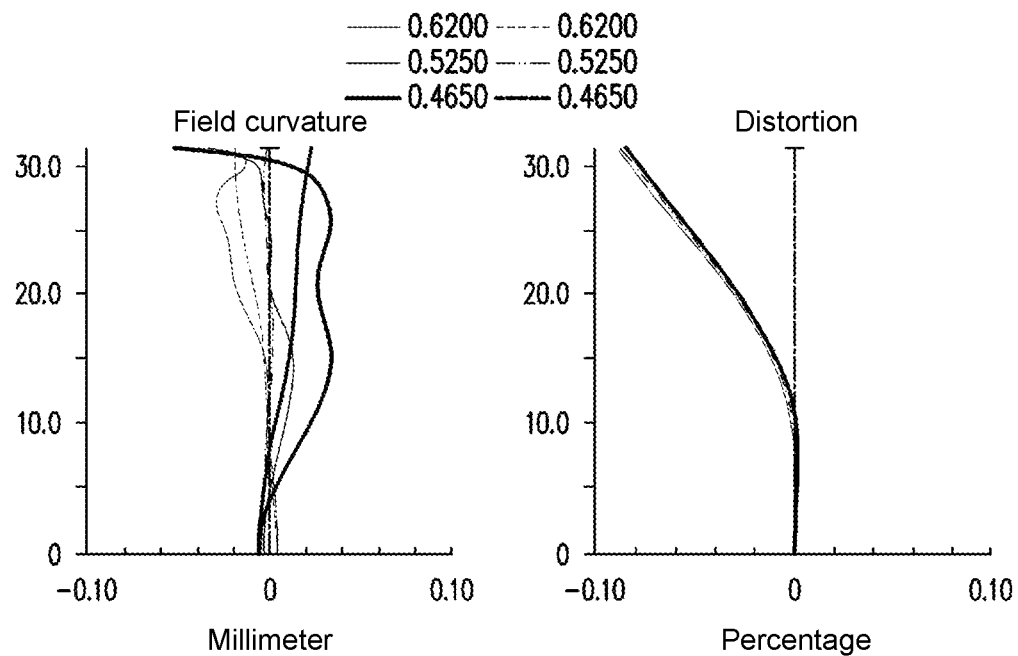
FIG. 2A is an astigmatic field curvature diagram and a distortion diagram of an optical lens of FIG. 1.
Figure 2B:
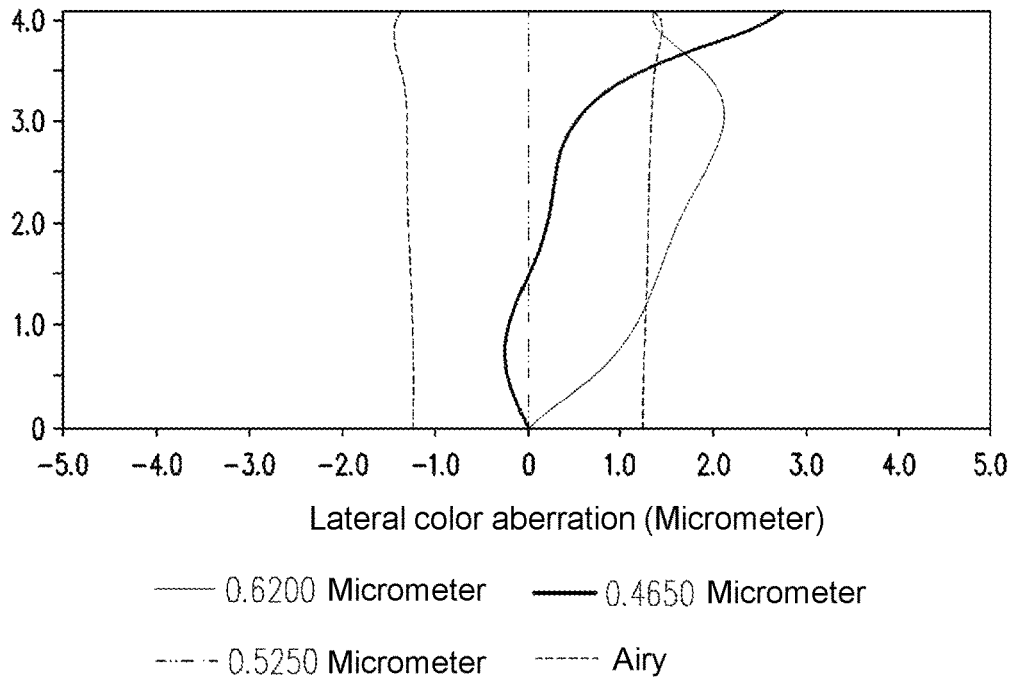
FIG. 2B is a lateral color aberration diagram of the optical lens of FIG. 1.
Figure 2C:
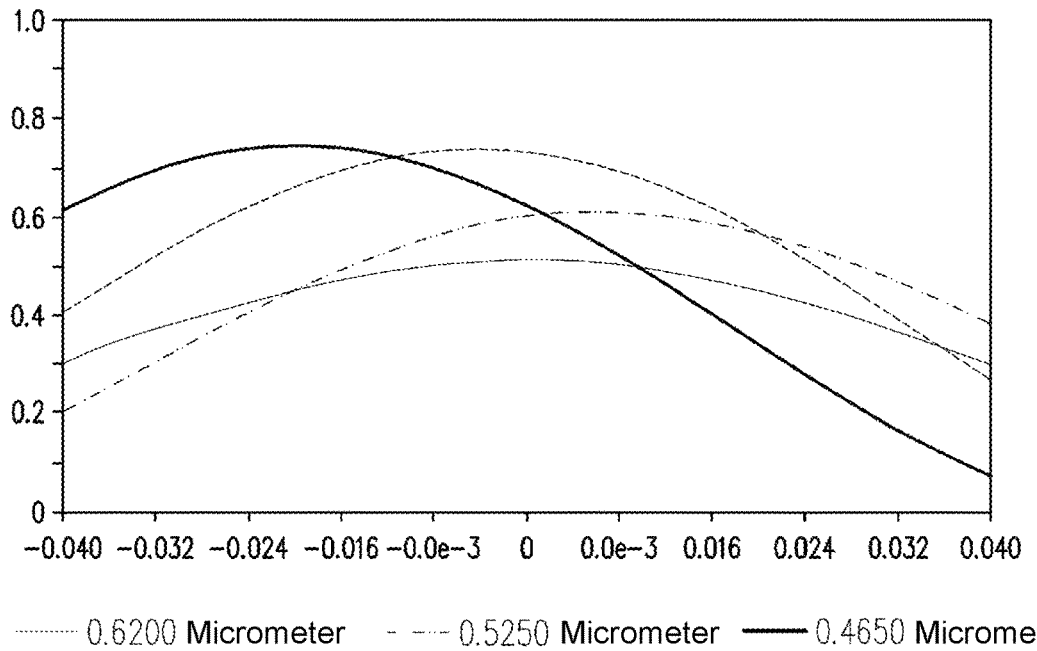
FIG. 2C is a modulation transfer function curve diagram of the optical lens of FIG. 1.
Figure 2D:
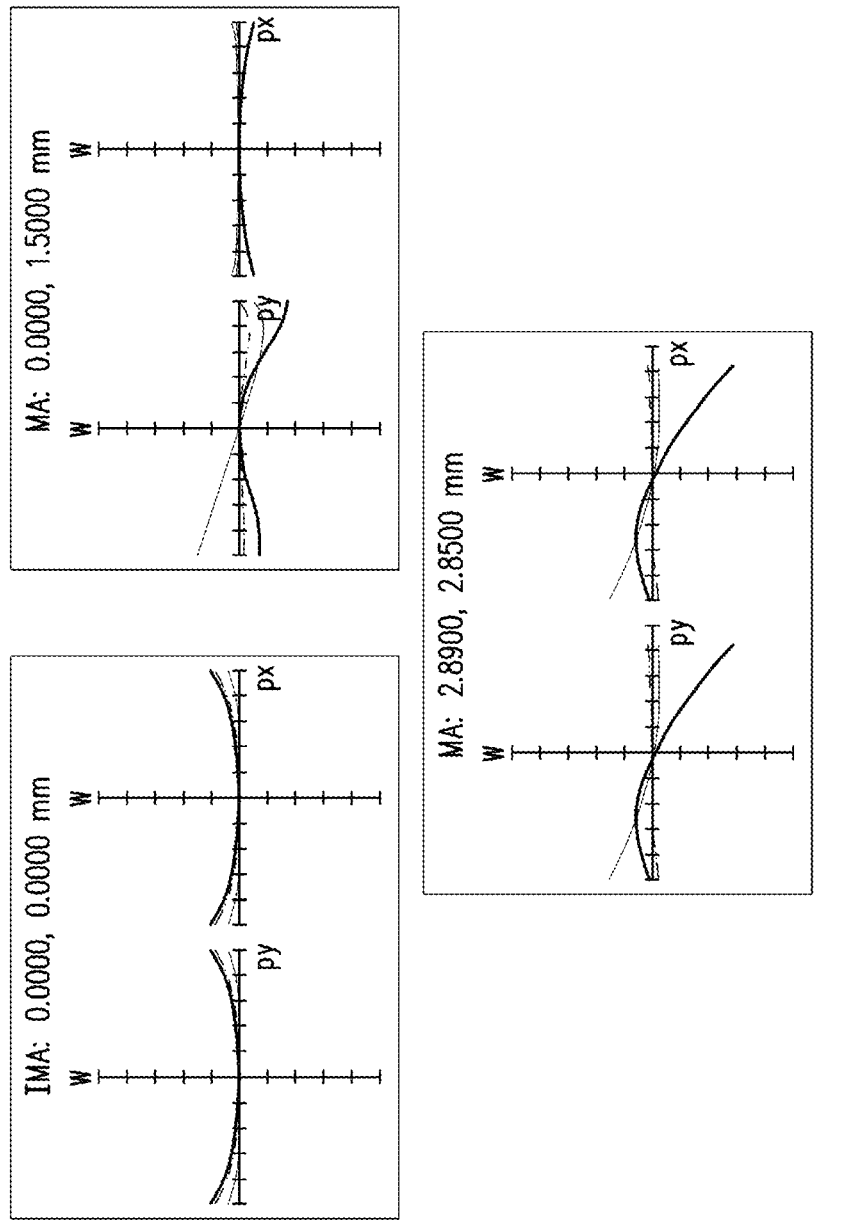
FIG. 2D is an optical path difference diagram of the optical lens of FIG. 1.

FIG. 2A is an astigmatic field curvature diagram and a distortion diagram of the optical lens of FIG. 1. FIG. 2B is a lateral color aberration diagram of the optical lens of FIG. 1, which is a simulation data diagram drawn based on light with a wavelength of 465 nm, 525 nm, and 620 nm, in which vertical coordinates represent image heights. FIG. 2C is a modulation transfer function curve diagram of the optical lens of FIG. 1, in which horizontal coordinates represent focus shifts, and vertical coordinates represent moduli of an optical transfer function (OTF). FIG. 2D is an optical path difference (OPD) diagram of the optical lens of FIG. 1. The figures shown in FIG. 2A to FIG. 2D are all within a standard range, and it is verified that the optical lens 110 of the embodiment may achieve a good imaging effect. Moreover, as shown in FIG. 2D, on an active surface of the image generator 150, an OPD range of the image beam IM is −2.0λ<OPD<2.0λ, where OPD is an optical path difference at each field of view, λ is a wavelength of each color light, and the image beam IM includes red light, green light, and blue light. The active surface of the image generator 150 is a surface from which the image beam IM exits. Further, regarding the design of the optical path difference, those skilled in the art may easily know the optical path difference of the image beam to be provided by the image source at each field of view through reverse deduction from an object plane (a preset target plane) by means of optical simulation when designing an optical lens. In the embodiment, the field of view FOV is designed and optimized to 60 degrees, which achieves better FOV coverage. A ratio of the field of view per unit cross-sectional area is high, and the ratio may reach 0.47 (degrees/square millimeter), so that the optical lens 110 is thinner, lighter, shorter, smaller in volume and has a 232 and the coupling exit 234 are, for example, a surface area where the image beam enters the waveguide element 230 and a surface area where the image beam leaves the waveguide element 230. The stop ST is formed at the coupling entrance 232 of the waveguide element 230. The image beam IM passes through the stop ST to enter the waveguide element 230 through the coupling entrance 232, and is transmitted to the coupling exit 234 of the waveguide element 230, and is projected to a target 900. The target 900 is, for example, a human eye. In the embodiment, the waveguide element 230 includes optical microstructure (not shown). The optical microstructures are disposed at the coupling exit 234, and the optical microstructures reflect the image beam IM and transmit the image beam IM to the coupling exit 234 to project the image beam IM to the target 900. In other embodiment, the optical microstructures may also be disposed at the coupling entrance 232 of the waveguide element 230. The image beam passes through the coupling entrance 232 through the optical microstructures and is transmitted in the waveguide element 230, and then the image beam is reflected by the optical microstructures at the coupling exit 234 to leave the waveguide element 230.

In the embodiment, one of the cases is that the optical lens 110 is complied with B×D<130; another case is that the optical lens 110 is complied with A+C<20; a further case is that the optical lens 110 is complied with FOV/(B×D)>0.4; a still another case is that the optical lens 110 is complied with FOV>50; a yet another case is that the optical lens 110 is complied with B×D<130, A+C<20, FOV/(B×D)>0.4, and FOV>50 at the same time, where A is a distance between the stop ST and the surface S1 of the optical lens 110 on the optical axis OA. In the embodiment, A is a sum of a distance between the surface S1 of the first lens 112 and a surface S9 of the turning prism 260 on the optical axis OA and a distance between the surface S9 of the turning prism 260 and the stop ST on the optical axis OA. In the embodiment, the above parameters A, B, C and D are, for example, respectively 5.8 mm, 10.84 mm, 11.45 mm, and 11.7 mm. The values of these parameters are for illustrative purposes only and are not intended to be limiting of the disclosure.

Referring to FIG. 3, an embodiment of the optical lens 110 is provided below. It should be noted that the data listed below is not intended to be limiting the disclosure, and any person skilled in the art may make appropriate changes to the parameters or settings after referring to the disclosure, which are still considered to be within a scope of the disclosure.

TABLE 3

| Element | Surface | Curvature (1/mm) | Space (mm) | Refractive index | Abbe number |
|---|---|---|---|---|---|
| First prism 260 | stop | 0 | 5.6 | 1.52 | 64 |
|  |  | 0 | 0.2 |  |  |
| First lens 112 | S1 | 0.026 | 1.88 | 2.0 | 19 |
|  | S2 | −0.154 | 1.25 |  |  |
| Second lens 114 | S3 | −0.48 | 1.00 | 2.0 | 19 |
|  | S4 | −0.04 | 0.10 |  |  |
| Third lens 116 | S5 | 0.035 | 3.48 | 1.77 | 50 |
|  | S6 | −0.166 | 0.10 |  |  |
| Fourth lens 118 | S7 | 0.146 | 3.04 | 1.77 | 50 |
|  | S8 | 0.015 | 0.35 |  |  |
| Transmission prism 120 |  | 0 | 9.4 | 1.83 | 37 |
|  |  | 0 | 0.3 |  |  |

Figure 4:
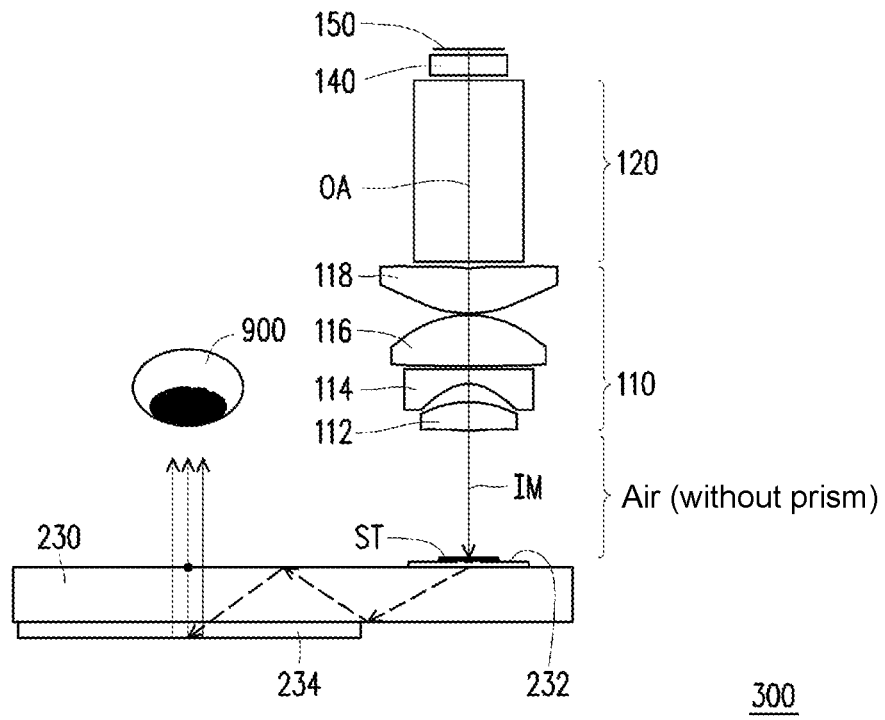
FIG. 4 is a schematic diagram of a head-mounted display device according to a third embodiment of the disclosure.

FIG. 4 is a schematic diagram of a head-mounted display device according to a third embodiment of the disclosure. Referring to FIG. 4, a head-mounted display device 300 of the embodiment is similar to the head-mounted display device 100 of FIG. 1, and a main difference there between lies in a design of the waveguide element 230. Moreover, in the embodiment, there is no glass block or prism between the stop ST and the first lens 112. The image beam IM is transmitted in the air after leaving the optical lens 110 and is converged to the stop ST.

In the embodiment, one of the cases is that the optical lens 110 is complied with B×D<130; another case is that the optical lens 110 is complied with A+C<20; a further case is that the optical lens 110 is complied with FOV/(B×D)>0.4; a still another case is that the optical lens 110 is complied with FOV>50; a yet another case is that the optical lens 110 is complied with B×D<130, A+C<20, FOV/(B×D)>0.4, and FOV>50 at the same time. In the embodiment, the above parameters A, B, C and D are, for example, respectively 3.8 mm, 10.85 mm, 11.45 mm, and 11.7 mm. The values of these parameters are for illustrative purposes only and are not intended to be limiting of the disclosure.

In summary, the first to the third embodiments of the disclosure have at least one of following advantages or effects. In the exemplary embodiments of the disclosure, the design of the optical lens is complied with the preset specification, so that the optical lens of the disclosure has a small size, a light weight, a large viewing angle and high resolution.

A fourth to sixth embodiments of the disclosure are described below.

Frameworks of the head-mounted display devices of the fourth to sixth embodiments of the disclosure are the same as the frameworks of the head-mounted display devices of the first to third embodiments shown in FIG. 1, FIG. 3, and FIG. 4, except that the first lens 112 and the second lens 114 of the fourth to sixth embodiments are plastic aspherical lenses, and the third lens 116 and the fourth lens 118 are glass aspherical lenses. Moreover, optical parameters of the head-mounted display devices of the fourth to sixth embodiments are different from the optical parameters of the head-mounted display device of the first embodiment, which is described in detail below.

In the fourth to sixth embodiments, one of the cases is that the optical lens 110 is complied with B×D<170; another case is that the optical lens 110 is complied with A+C<25; a further case is that the optical lens 110 is complied with FOV/(B×D)>0.2; a still another case is that the optical lens 110 is complied with FOV>40; a yet another case is that the optical lens 110 is complied with B×D<170, A+C<25, FOV/(B×D)>0.2, and FOV>40 at the same time, where A is a distance between the stop ST and the surface S1 of the optical lens 110 on the optical axis OA. In the fourth to sixth embodiments, A is a sum of a distance between the surface S1 of the first lens 112 and the surface S9 of the turning prism 260 on the optical axis OA and a distance between the surface S9 of the turning prism 260 and the stop ST on the optical axis OA. Parameters of the fourth to sixth embodiments are as show in following Table 4 and Table 5. Values of the parameters are not intended to be limiting of the disclosure.

TABLE 4

| Unit: mm | A | B | C | D |
|---|---|---|---|---|
| Fourth embodiment | 5.45 | 7.9 | 6.35 | 8.1 |
| Fifth embodiment | 5.45 | 7.9 | 6.35 | 8.1 |
| Sixth embodiment | 3.55 | 7.9 | 6.35 | 8.1 |

TABLE 5

| Unit: mm | A + C | B × D | FOV/(B × D) | FOV |
|---|---|---|---|---|
| Fourth embodiment | 11.8 | 63.99 | 0.75 | 47.8 |
| Fifth embodiment | 11.8 | 63.99 | 0.75 | 47.8 |
| Sixth embodiment | 9.9 | 63.99 | 0.75 | 47.8 |

Figure 5A:
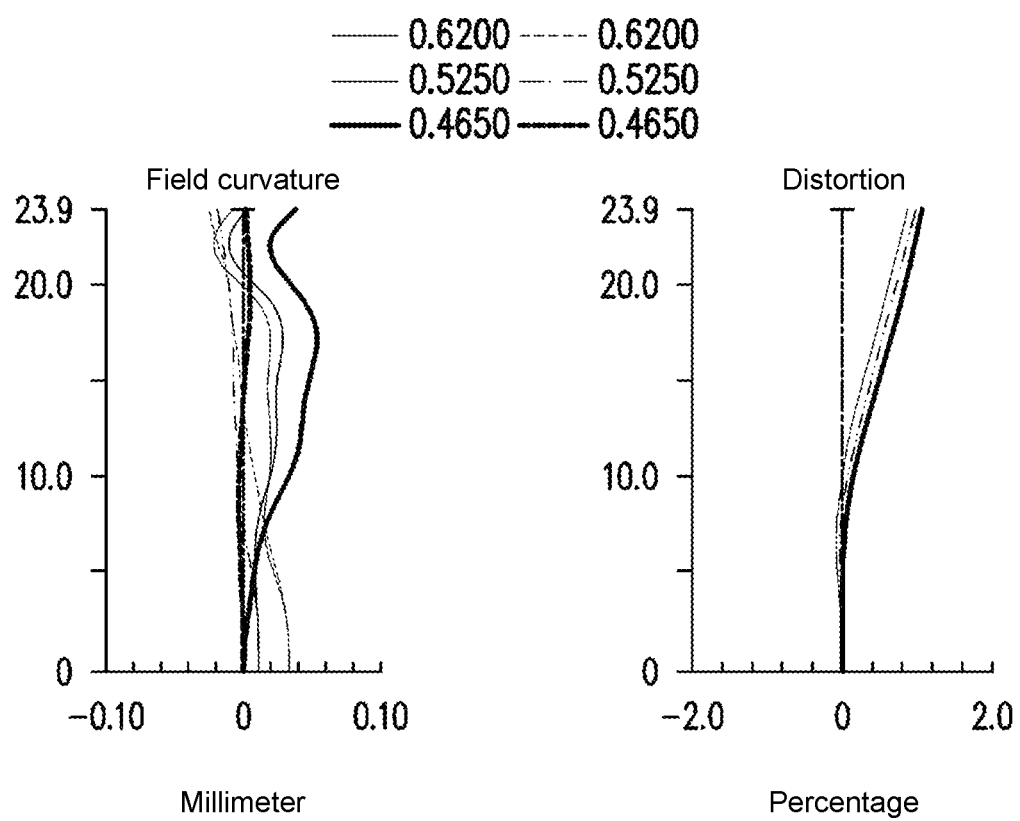
FIG. 5A is an astigmatic field curvature diagram and a distortion diagram of an optical lens of a fourth to sixth embodiments.
Figure 5B:
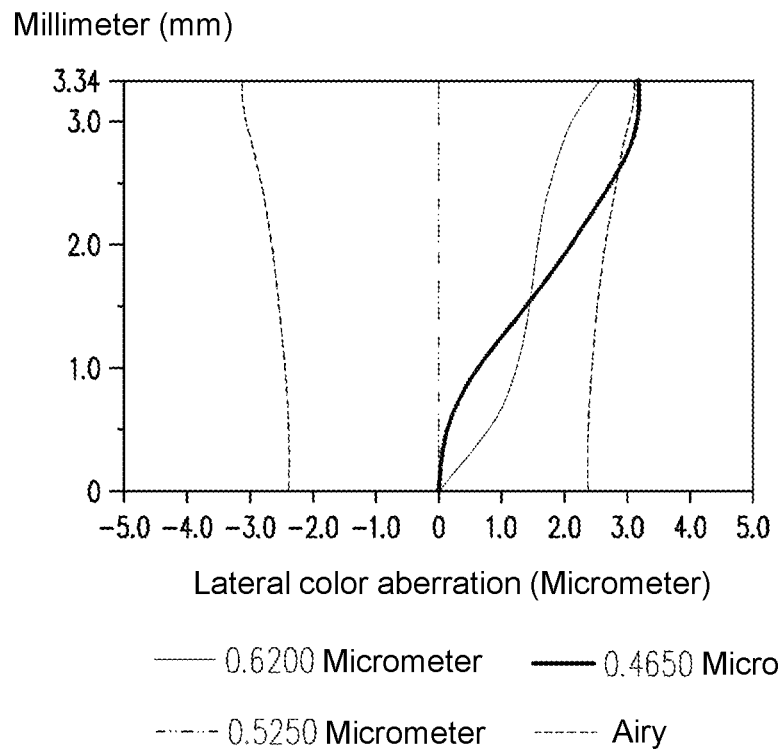
FIG. 5B is a lateral color aberration diagram of the optical lens of the fourth to sixth embodiments.
Figure 5C:
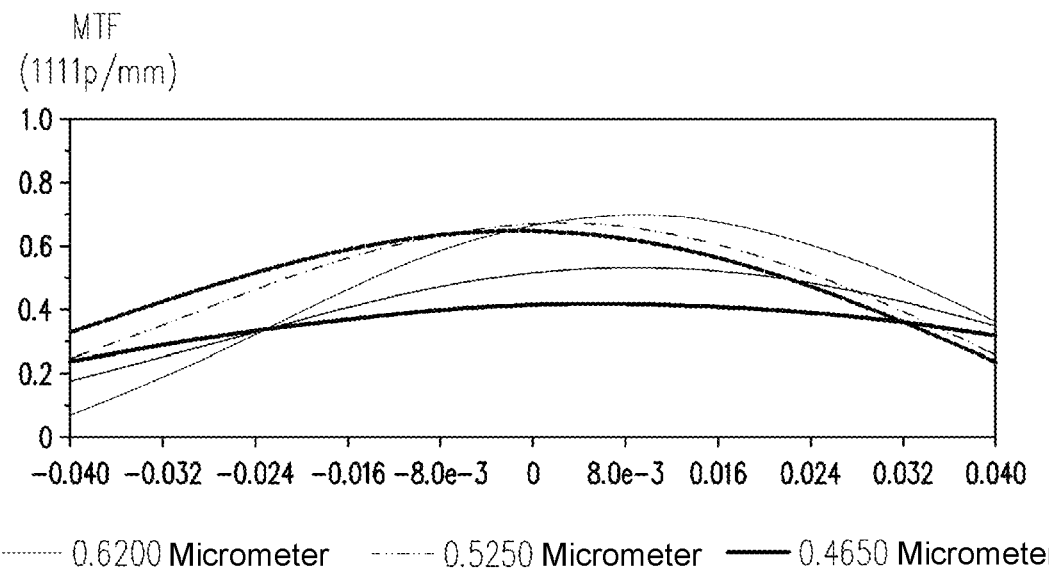
FIG. 5C is a modulation transfer function curve diagram of the optical lens of the fourth to sixth embodiments.
Figure 5D:
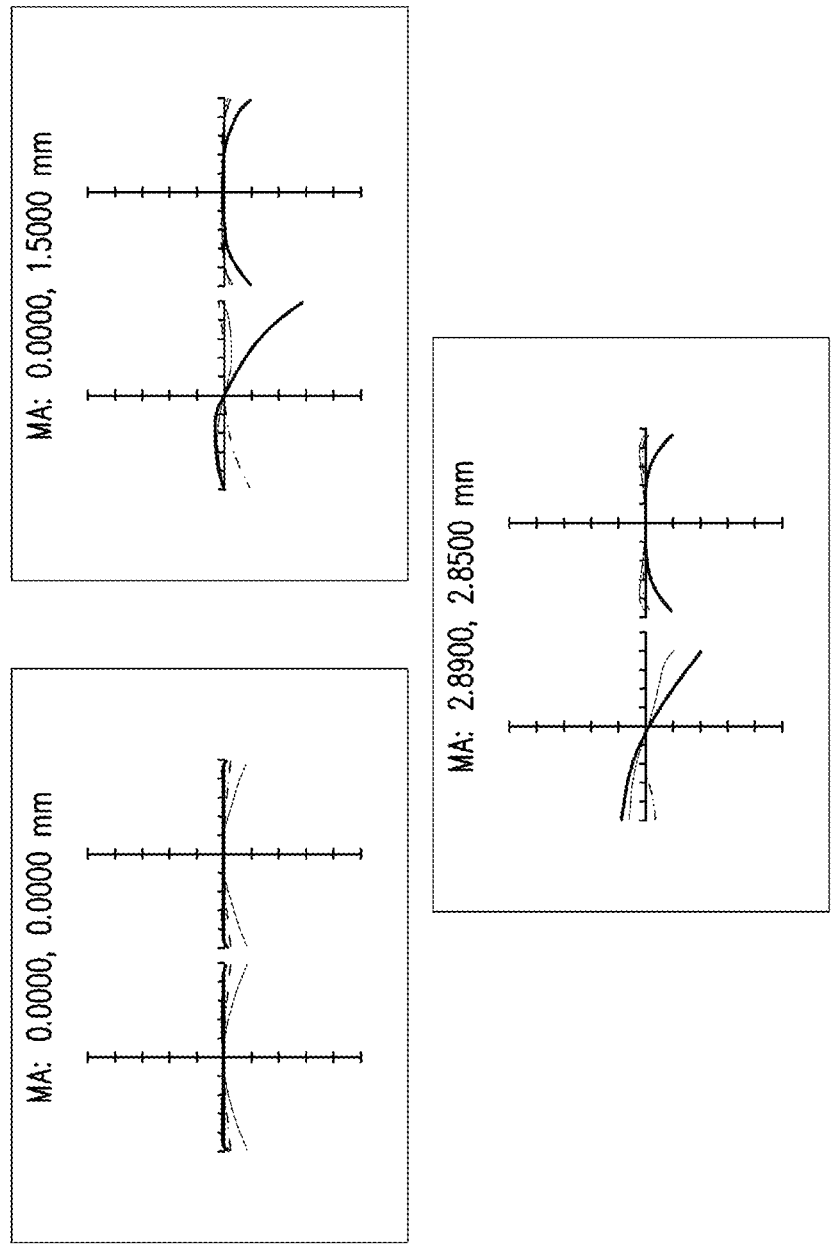
FIG. 5D is an optical path difference diagram of the optical lens of the fourth to sixth embodiments.

FIG. 5A is an astigmatic field curvature diagram and a distortion diagram of an optical lens of the fourth to sixth embodiments. FIG. 5B is a lateral color aberration diagram of the optical lens of the fourth to sixth embodiments, which is a simulation data diagram drawn based on light with a wavelength of 465 nm, 525 nm, and 620 nm, in which vertical coordinates represent image heights. FIG. 5C is a modulation transfer function curve diagram of the optical lens of the fourth to sixth embodiments, in which horizontal coordinates represent focus shifts, and vertical coordinates represent moduli of an OTF (MTF). FIG. 5D is an optical path difference (OPD) diagram of the optical lens of the fourth to sixth embodiments. The figures shown in FIG. 5A to FIG. 5D are all within a standard range, and it is verified that the optical lens 110 of the fourth to sixth embodiments may achieve a good imaging effect. Moreover, as shown in FIG. 5D, on an active surface of the image generator 150, an OPD range of the image beam IM is:

$-2.0\lambda < OPD < 2.0\lambda$, where OPD is an optical path difference at each field of view, $\lambda$ is a wavelength of each color light, and the image beam IM includes red light, green light, and blue light. The active surface of the image generator 150 is a surface from which the image beam IM exits. Further, regarding the design of the optical path difference, those skilled in the art may easily know the optical path difference of the image beam to be provided by the image source at each field of view through reverse deduction from an object plane by means of optical simulation when designing an optical lens. In the fourth to sixth embodiments, the field of view FOV is designed and optimized to 47.8 degrees, which achieves better FOV coverage. A ratio of the field of view per unit cross-sectional area is high, and the ratio may reach 0.75 (degrees/square millimeter), so that the optical lens 110 is thinner, lighter, shorter, smaller in volume and has a higher effective spatial utilization rate. Referring to FIG. 5B to FIG. 5D, in the embodiment, the maximum image height formed on the active surface of the image generator 150 is 3.34 mm, the design of the optical lens 110 is complied with a preset specification, and the optical lens 110 may analyze images with a resolution of at least 111 lp/mm. Therefore, the optical lens 110 has a small size, a light weight, a large viewing angle and high resolution.

An embodiment of the optical lens 110 of the fourth embodiment is provided below. It should be noted that the data listed below is not intended to be limiting the disclosure, and any person skilled in the art may make appropriate changes to the parameters or settings after referring to the disclosure, which are still considered to be within a scope of the disclosure.

aspherical lenses. A material of the first lens 112 and the second lens 114 is plastic, and a material of the third lens 116 and the fourth lens 118 is glass. An equation of the aspherical lens is as follows:

$$X = \frac{Y^2}{R(1 + \sqrt{1 - (1+k)*Y^2/R^2})} + A_2Y^2 + A_4Y^4 + A_6Y^6 + A_8Y^8 + A_{10}Y^{10} + A_{12}Y^{12} \ldots + A_{14}Y^{14} + A_{16}Y^{16}$$

In the above equation, X is a sag in the direction of the optical axis OA, and R is a radius of an osculating sphere, i.e., a radius of curvature near the optical axis OA (a reciprocal of the curvature listed in the Table 1). k is a conic coefficient, Y is an aspheric height, i.e., a height from a lens center to a lens edge, and coefficients $A_2$, $A_4$, $A_6$, $A_8$, $A_{10}$, $A_{12}$, $A_{14}$, $A_{16}$ are aspheric coefficients. In the embodiment, the coefficient $A_2$ is 0. The following Table 7 lists parameter values of the surfaces of each of the lenses.

TABLE 7

|     | S1 | S2 | S3 | S4 | S5 | S6 | S7 | S8 |
|---|---|---|---|---|---|---|---|---|
| k   | 0 | 0 | −2.71E+00 | 9.90E+01 | 0 | −7.78E−01 | −2.25E−01 | 0 |
| A4  | −1.90E−03 | 1.04E−02 | −8.80E−03 | −4.22E−03 | 2.60E−03 | 3.66E−03 | −3.28E−03 | −3.69E−03 |
| A6  | 2.36E−04 | −4.51E−04 | 1.68E−03 | 4.30E−04 | −1.34E−04 | 6.50E−07 | 3.91E−04 | 7.80E−04 |
| A8  | −4.40E−05 | 4.51E−05 | −1.70E−04 | −1.61E−04 | 2.80E−06 | −4.52E−05 | −4.32E−05 | −8.57E−05 |
| A10 | 2.37E−06 | 5.01E−08 | −3.97E−06 | −1.16E−06 | 1.44E−07 | 3.90E−06 | 2.10E−06 | 5.40E−06 |
| A12 | 0 | 0 | 3.00E−06 | 9.61E−08 | 1.25E−09 | −1.20E−07 | −3.58E−08 | −2.10E−07 |
| A14 | 0 | 0 | −3.23E−07 | −1.53E−09 | −1.32E−10 | 1.32E−09 | −1.19E−10 | 5.36E−09 |
| A16 | 0 | 0 | 1.15E−08 | −2.26E−12 | 0 | 0 | 1.07E−12 | −7.47E−11 |

TABLE 6

| Element | Surface | Curvature (1/mm) | Space (mm) | Refractive index | Abbe number |
|---|---|---|---|---|---|
| First lens 112 | S1 | 0.059 | 1.82 | 1.64 | 22 |
|  | S2 | −0.297 | 0.77 |  |  |
| Second lens 114 | S3 | −0.537 | 0.92 | 1.67 | 19 |
|  | S4 | 0.01 | 0.18 |  |  |
| Third lens 116 | S5 | −0.065 | 2.43 | 1.5 | 82 |
|  | S6 | −0.256 | 0.10 |  |  |
| Fourth lens 118 | S7 | 0.148 | 1.69 | 1.77 | 50 |
|  | S8 | 0.014 | 6.35 |  |  |

Referring to FIG. 1 and the Table 6, surfaces of each of the lenses (including the first lens 112 to the fourth lens 118) are listed in the Table 6. For example, the surface S1 is a surface of the first lens 112 facing the light exit side ES, and the surface S2 is a surface of the first lens 112 facing the light incident side IS, and the others may be deduced by analogy. Moreover, the space refers to a straight line distance between two adjacent surfaces on the optical axis OA. For example, the space corresponding to the surface S1 represents a straight line distance from the surface S1 to the surface S2 on the optical axis OA, and the space corresponding to the surface S2 represents a straight line distance from the surface S2 to the surface S3 on the optical axis OA, and the others may be deduced by analogy.

Figure 6:
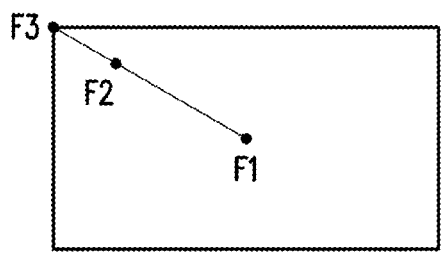
FIG. 6 is a schematic diagram of a display image of the fourth to sixth embodiments.
Figure 7A:
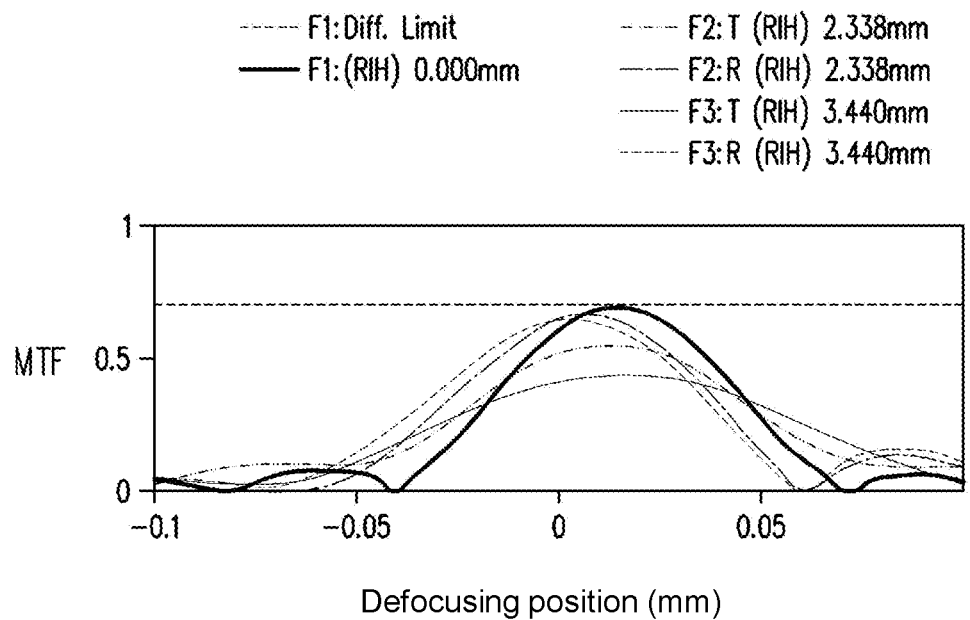
FIG. 7A, FIG. 7B and FIG. 7C are schematic diagrams respectively illustrating a modulation conversion function of thermal balance of the optical lens of the fourth to sixth embodiments at ambient temperatures of 0° C., 25° C. and 40° C.
Figure 7B:
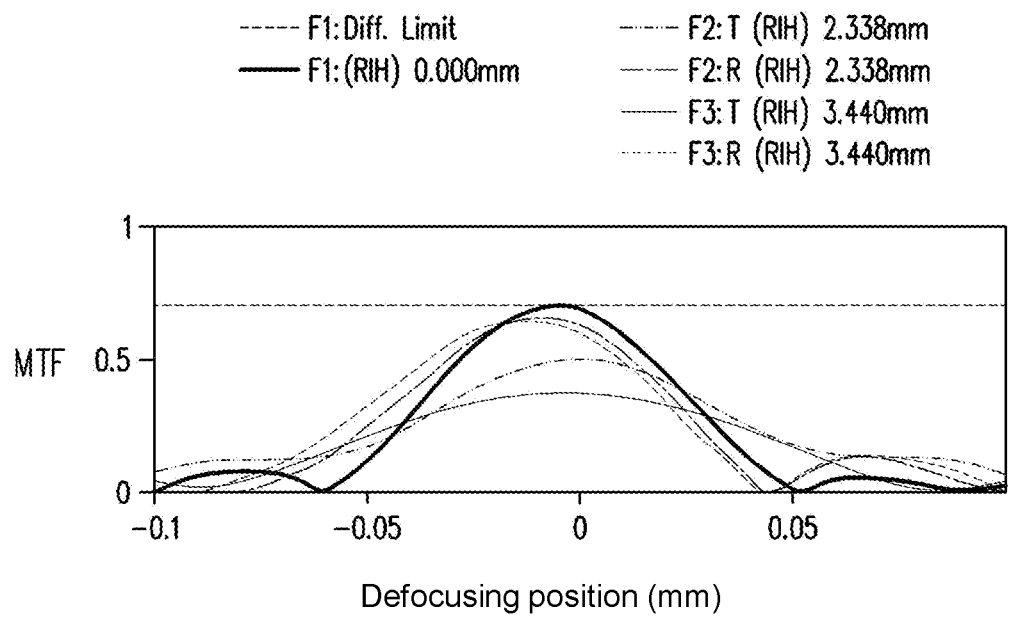
Figure 7C:
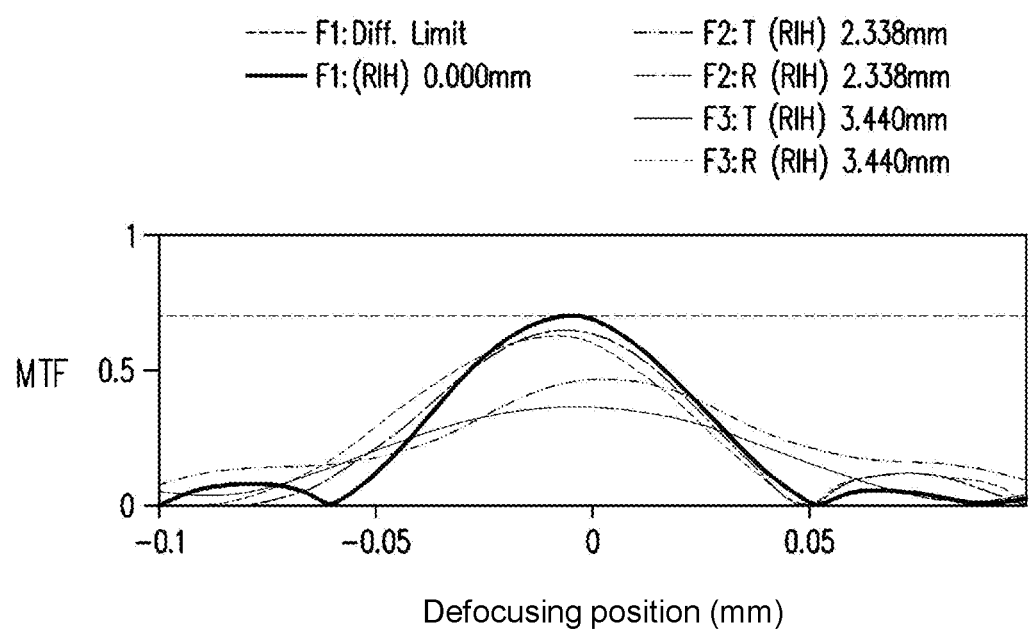

In the fourth embodiment, the first lens 112, the second lens 114, the third lens 116, and the fourth lens 118 may be The framework of the optical lens of the fourth to sixth embodiments may mitigate the problem of thermal drift, which is described in detail below. FIG. 6 is a schematic diagram of a display image of the fourth to sixth embodiments. FIG. 7A, FIG. 7B and FIG. 7C are schematic diagrams respectively illustrating a modulation conversion function (MTF) of thermal balance of the optical lens of the fourth to sixth embodiments at ambient temperatures of 0° C., 25° C. and 40° C. A following Table 8 lists lens temperatures of each of the lens (including the first lens 112 to the fourth lens 118) at different ambient temperatures.

TABLE 8

| Ambient temperature (° C.) | Lens temperature (° C.) | | | |
|---|---|---|---|---|
|  | First lens | Second lens | Third lens | Fourth lens |
| 0 | 11 | 12 | 14 | 16 |
| 25 | 36 | 37 | 39 | 41 |
| 40 | 51 | 52 | 54 | 56 |

In FIG. 6, vertical coordinates represent MTF, and horizontal coordinates represent defocusing positions. F1 is an image center, F2 is a position from the image center, and F3 is a position of an image boundary. For example, a distance from F1 to F3 is 1, and a distance from F1 to F2 is 0.7. In FIG. 7A, FIG. 7B and FIG. 7C, F2: T represents a tangential direction, and F2: R represents a radial direction. From FIG. 7A, FIG. 7B and FIG. 7C, it is known that thermal drifts of back focal lengths (BFL) of the frameworks of the optical lenses of the fourth to sixth embodiments are less than 0.015 mm, so that the problem of the thermal drift is mitigated.

A seventh to ninth embodiments of the disclosure are described below.

Figure 8:
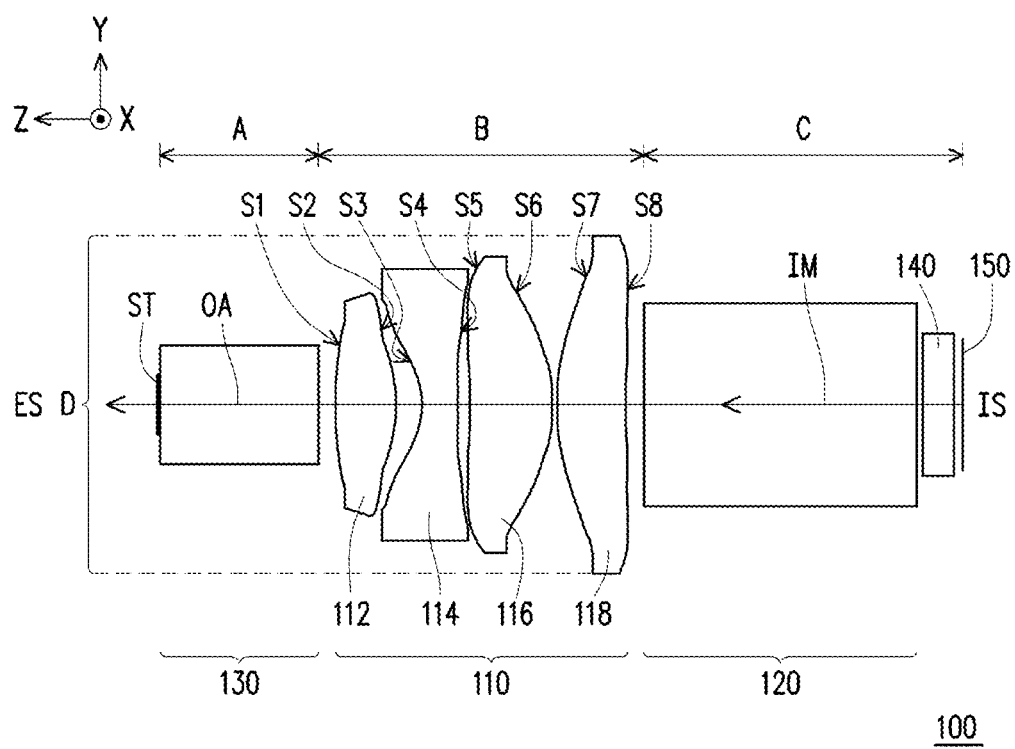
FIG. 8 is a schematic diagram of a head-mounted display device according to a seventh embodiment of the disclosure.

FIG. 8 is a schematic diagram of a head-mounted display device according to the seventh embodiment of the disclosure. Referring to FIG. 8, in the embodiment, the first lens 112, the second lens 114 and the third lens 116 are plastic aspherical lenses. The fourth lens 118 is a glass aspherical lens.

In the embodiment, one of the cases is that the optical lens 110 is complied with B×D<170, where B is a total lens length of the optical lens 110, and in the embodiment, B is, for example, a distance from the surface S1 to the surface S8 on the optical axis OA, and D is a clear aperture of the largest lens in the optical lens 110, and in the embodiment, D is, for example, a clear aperture of the fourth lens 118. In the embodiment, another case is that the optical lens 110 is complied with A+C<25, where A is a distance between the stop ST and the surface S1 of the optical lens 110 on the optical axis OA, i.e. a distance between the stop ST and a light exit surface of the first lens 112, and C is a distance between the surface S8 of the optical lens 110 and the surface of the image generator 150 on the optical axis OA. In the embodiment, a further case is that the optical lens 110 is complied with FOV/(B×D)>0.2, where FOV is a field of view of the optical lens 110. In the embodiment, a still another case is that the optical lens 110 is complied with FOV>40. In the embodiment, a yet another case is that the optical lens 110 is complied with B×D<170, A+C<25, FOV/(B×D)>0.2, and FOV>40 at the same time. Definitions of the above parameters A, B, C, D, FOV are the same as that described above. In the embodiment, the above parameters A, B, C, and D are, for example, respectively 5.45 mm, 7.7 mm, 6.35 mm, and 8.2 mm. The above parameters A+C, B×D, FOV/(B×D), and FOV are, for example, respectively 11.8 mm, 63.14 mm, 0.77 mm, and 48.73 mm. The values of these parameters are not intended to be limiting of the disclosure.

An embodiment of the optical lens 110 is provided below. It should be noted that the data listed below is not intended to be limiting the disclosure, and any person skilled in the art may make appropriate changes to the parameters or settings after referring to the disclosure, which are still considered to be within a scope of the disclosure.

TABLE 9

| Element | Surface | Curvature (1/mm) | Space (mm) | Refractive index | Abbe number |
|---|---|---|---|---|---|
| First lens 112 | S1 | 0.09 | 1.6 | 1.64 | 22 |
|  | S2 | −0.29 | 0.7 |  |  |
| Second lens 114 | S3 | −0.57 | 0.94 | 1.67 | 19 |
|  | S4 | 0.03 | 0.32 |  |  |
| Third lens 116 | S5 | −0.04 | 2.19 | 1.53 | 56 |
|  | S6 | −0.24 | 0.10 |  |  |
| Fourth lens 118 | S7 | 0.17 | 1.83 | 1.77 | 50 |
|  | S8 | 0.032 | 6.35 |  |  |

Referring to FIG. 8 and the Table 9, surfaces of each of the lenses (including the first lens 112 to the fourth lens 118) are listed in the Table 9. For example, the surface S1 is a surface of the first lens 112 facing the light exit side ES, and the surface S2 is a surface of the first lens 112 facing the light incident side IS, and the others may be deduced by analogy. Moreover, the space refers to a straight line distance between two adjacent surfaces on the optical axis OA. For example, the space corresponding to the surface S1 represents a straight line distance from the surface S1 to the surface S2 on the optical axis OA, and the space corresponding to the surface S2 represents a straight line distance from the surface S2 to the surface S3 on the optical axis OA, and the others may be deduced by analogy.

In the embodiment, the first lens 112, the second lens 114, the third lens 116, and the fourth lens 118 may be aspherical lenses. An equation of the aspherical lens is as follows:

$$X = \frac{Y^2}{R(1 + \sqrt{1 - (1+k)*Y^2/R^2})} + A_2Y^2 + A_4Y^4 + A_6Y^6 + A_8Y^8 + A_{10}Y^{10} + A_{12}Y^{12} \ldots + A_{14}Y^{14} + A_{16}Y^{16}$$

In the above equation, X is a sag in the direction of the optical axis OA, and R is a radius of an osculating sphere, i.e., a radius of curvature near the optical axis OA (a reciprocal of the curvature listed in the Table 1). k is a conic coefficient, Y is an aspheric height, i.e., a height from a lens center to a lens edge, and coefficients $A_2$, $A_4$, $A_6$, $A_8$, $A_{10}$, $A_{12}$, $A_{14}$, $A_{16}$ are aspheric coefficients. In the embodiment, the coefficient $A_2$ is 0. The following Table 10 lists parameter values of the surfaces of each of the lenses.

TABLE 10

|  | S1 | S2 | S3 | S4 | S5 | S6 | S7 | S8 |
|---|---|---|---|---|---|---|---|---|
| k | 0 | 0 | −2.50E+00 | 9.90E+01 | 0 | −8.11E−01 | −4.99E−01 | 0 |
| A4 | 4.04E−04 | 1.44E−02 | 1.40E−03 | 3.90E−04 | 3.04E−03 | 2.35E−03 | −3.81E−03 | −3.52E−03 |
| A6 | 2.91E−04 | −1.46E−04 | 1.16E−03 | 2.13E−04 | −1.67E−04 | 8.78E−05 | 4.31E−04 | 7.03E−04 |
| A8 | −3.97E−05 | 1.38E−04 | 3.65E−05 | −1.95E−05 | 5.84E−06 | −4.37E−05 | −4.02E−05 | −7.77E−05 |
| A10 | −4.11E−06 | −5.23E−06 | −4.74E−05 | −8.59E−07 | 1.16E−07 | 3.70E−06 | 1.95E−06 | 5.06E−06 |
| A12 | −4.68E−07 | −1.22E−06 | 1.04E−05 | 1.21E−07 | 1.68E−08 | −1.40E−07 | −5.15E−08 | −2.23E−07 |
| A14 | 1.04E−07 | −7.94E−08 | −1.06E−06 | −3.63E−09 | 1.03E−09 | 3.52E−09 | 5.32E−10 | 6.12E−09 |
| A16 | −6.70E−09 | 8.17E−09 | 3.45E−08 | −3.66E−11 | −7.50E−11 | 1.08E−10 | 0 | −7.78E−11 |

Figure 9A:
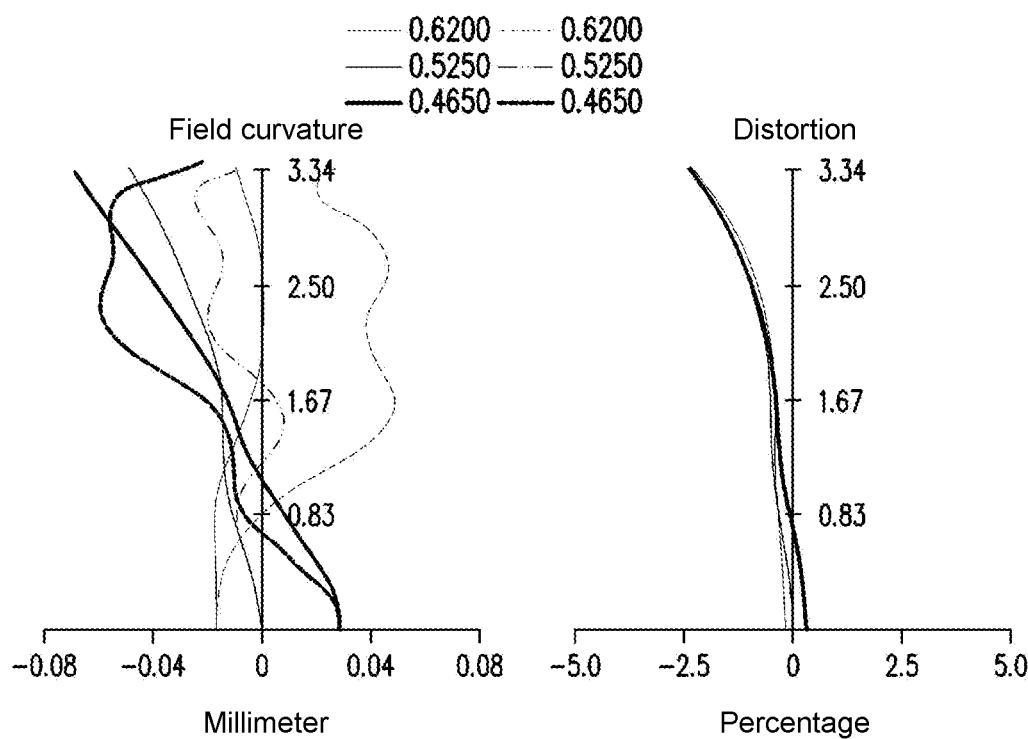
FIG. 9A is an astigmatic field curvature diagram and a distortion diagram of an optical lens of FIG. 8.
Figure 9B:
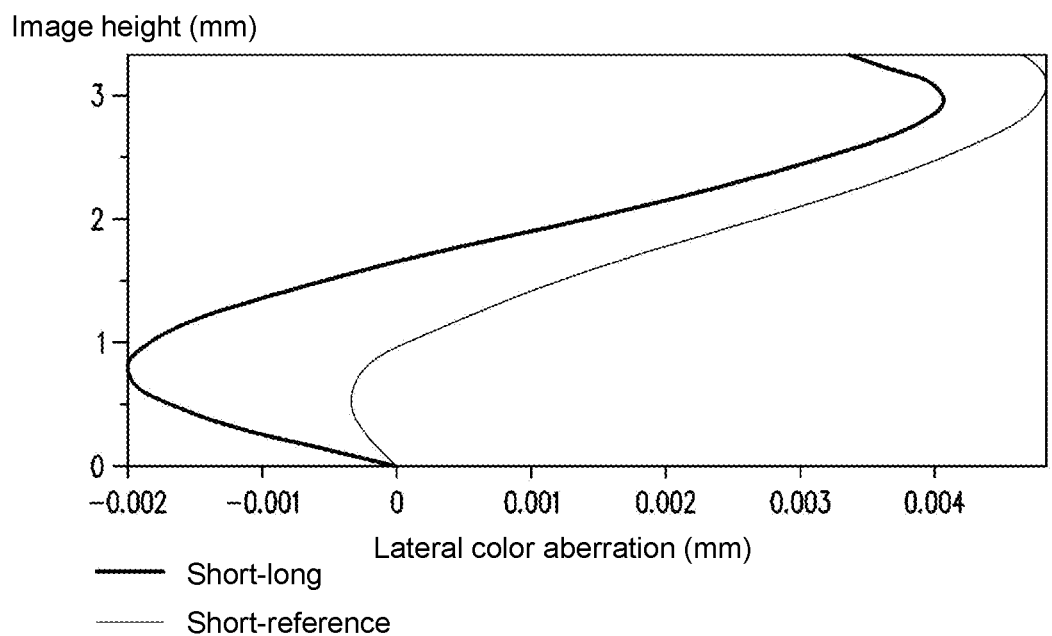
FIG. 9B is a lateral color aberration diagram of the optical lens of FIG. 8.
Figure 9C:
FIG. 9C is an optical path difference diagram of the optical lens of FIG. 8.
Figure 10A:
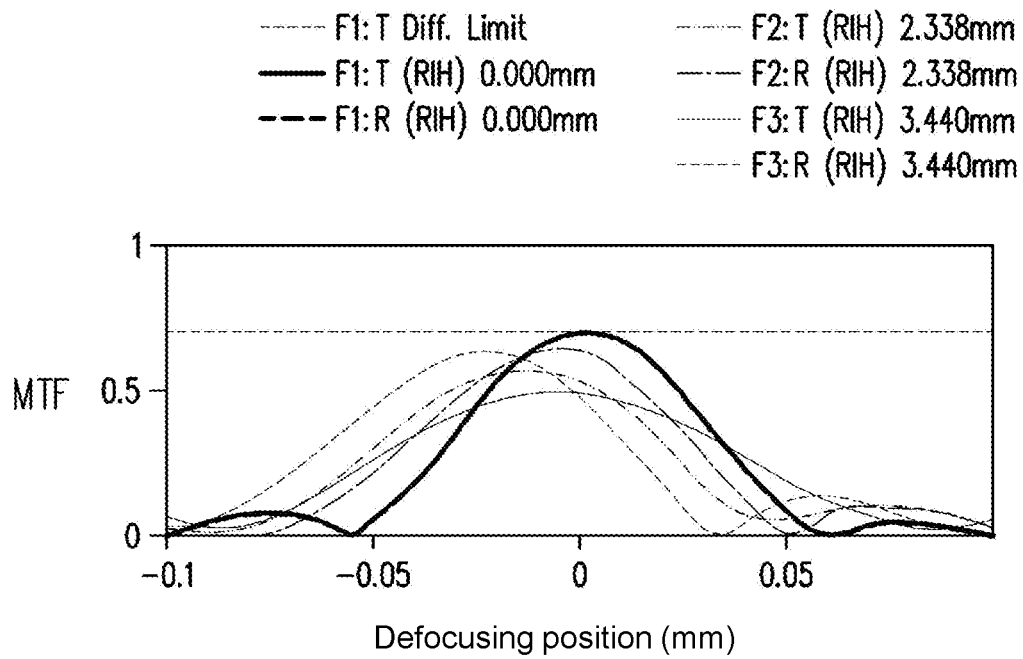
FIG. 10A, FIG. 10B, FIG. 10C and FIG. 10D are schematic diagrams respectively illustrating a modulation conversion function of thermal balance of the optical lens of the seventh embodiment at ambient temperatures of 20° C., 0° C., 25° C. and 40° C.
Figure 10B:
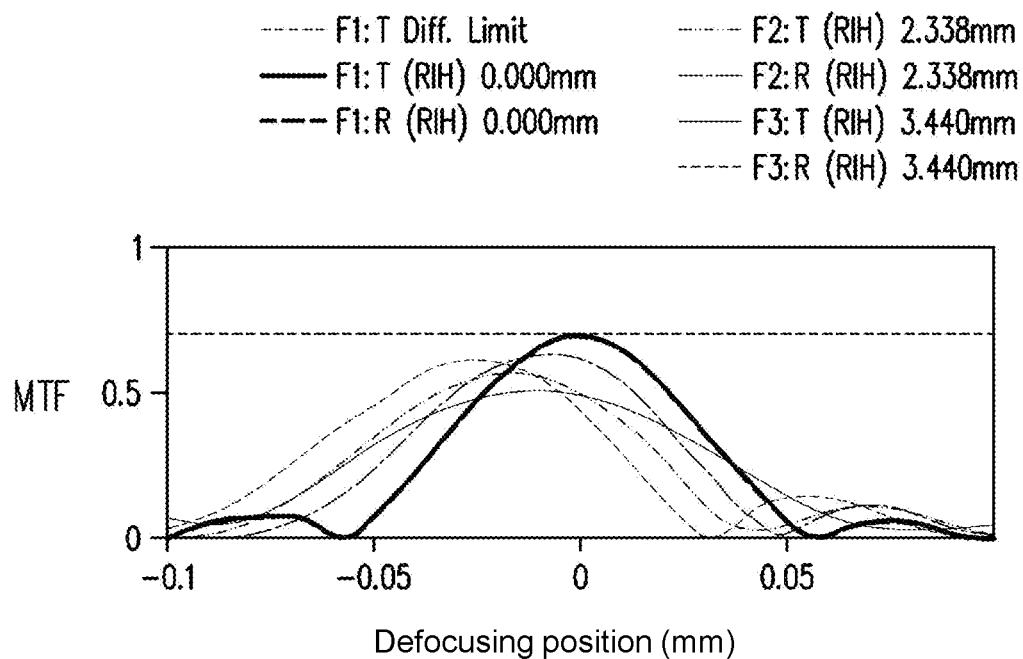
Figure 10C:
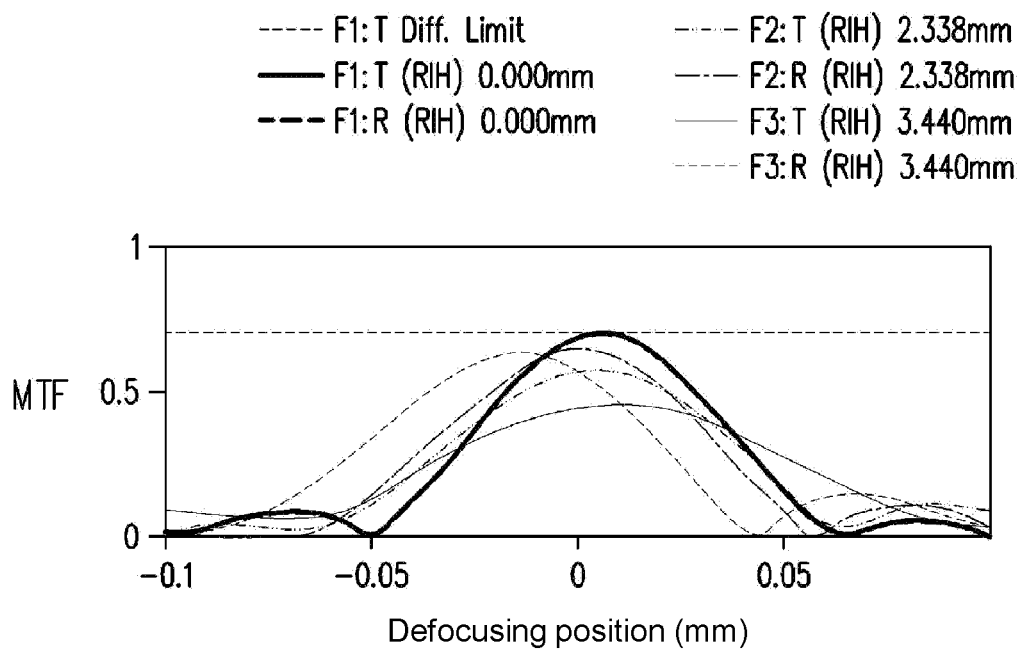
Figure 10D:
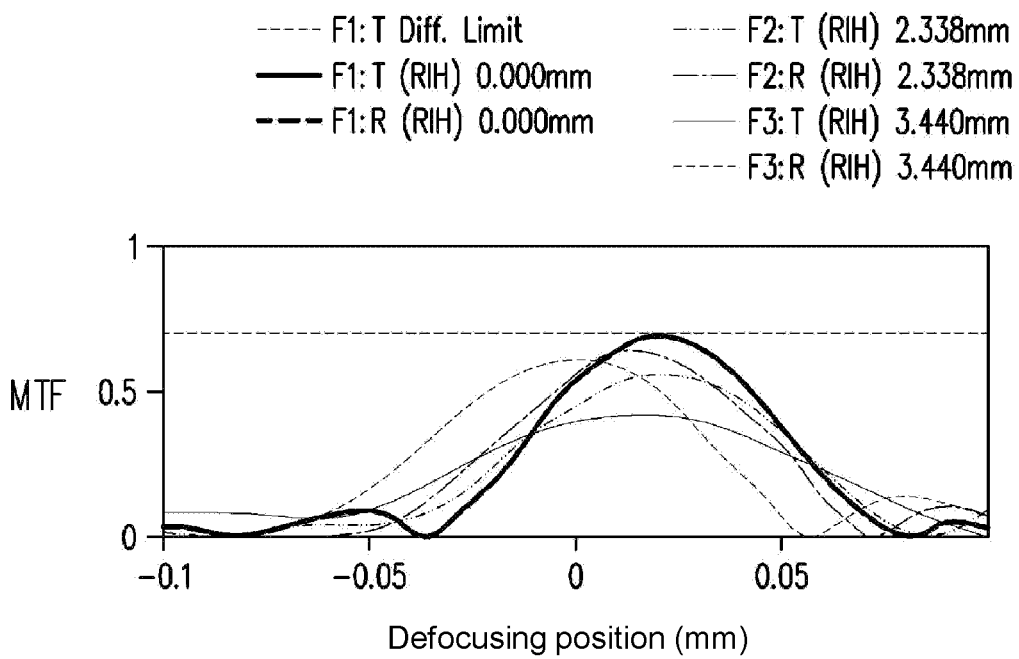

FIG. 9A is an astigmatic field curvature diagram and a distortion diagram of the optical lens of FIG. 8. FIG. 9B is a lateral color aberration diagram of the optical lens of FIG. 8, which is a simulation data diagram drawn based on light with a wavelength of 465 nm, 525 nm, and 620 nm, in which vertical coordinates represent image heights. FIG. 9C is an optical path difference (OPD) diagram of the optical lens of FIG. 8. The figures shown in FIG. 9A to FIG. 9C are all within a standard range, and it is verified that the optical lens 110 of the embodiment may achieve a good imaging effect. Moreover, as shown in FIG. 9C, on an active surface of the image generator 150, an OPD range of the image beam IM is −2.0λ<OPD<2.0λ, where OPD is an optical path difference at each field of view, λ is a wavelength of each color light, and the image beam IM includes red light, green light, and blue light. The active surface of the image generator 150 is a surface from which the image beam IM exits. Further, regarding the design of the optical path difference, those skilled in the art may easily know the optical path difference of the image beam to be provided by the image source at each field of view through reverse deduction from an object plane by means of optical simulation when designing an optical lens. In the embodiment, the field of view FOV is designed and optimized to 48.73 degrees, which achieves better FOV coverage. A ratio of the field of view per unit cross-sectional area is high, and the ratio may reach 0.77 (degrees/square millimeter), so that the optical lens 110 is thinner, lighter, shorter, smaller in volume and has a higher effective spatial utilization rate. Referring to FIG. 9B to FIG. 9C, in the embodiment, the maximum image height formed on the active surface of the image generator 150 is 3.34 mm, the design of the optical lens 110 is complied with a preset specification, and the optical lens 110 may analyze images with a resolution of at least 111 lp/mm. Therefore, the optical lens 110 has a small size, a light weight, a large viewing angle and high resolution.

The framework of the optical lens of the seventh embodiment may mitigate the problem of thermal drift, which is described in detail below. FIG. 10A, FIG. 10B, FIG. 10C and FIG. 10D are schematic diagrams respectively illustrating a modulation conversion function (MTF) of thermal balance of the optical lens of the seventh embodiment at ambient temperatures of 20° C., 0° C., 25° C. and 40° C. Various optical parameters of the optical lens 110 are, for example, designed with reference of the ambient temperature of 20° C. Therefore, the MTF of thermal balance shown in FIG. 10A may be used as a reference value for determining whether the optical lens 110 generates thermal drift. According to FIG. 10B, FIG. 10C and FIG. 10D, it is known that when the ambient temperature is changed from 0° C. to 40° C., the MTF of the optical lens 110 is still greater than 40% after such thermal effect.

Figure 11:
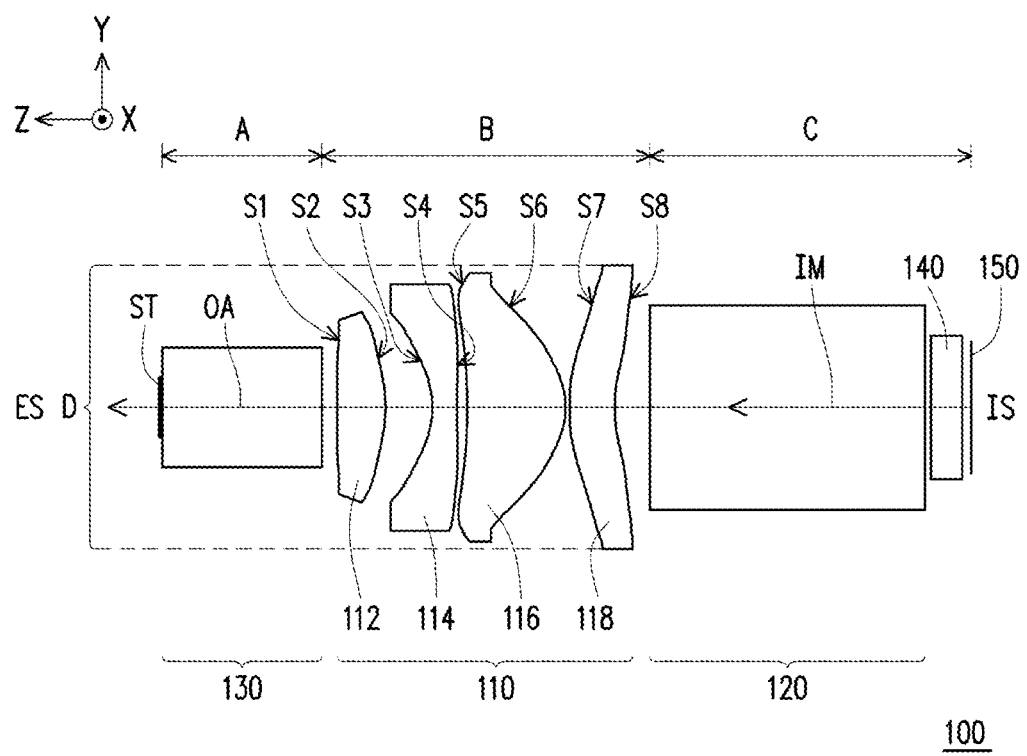
FIG. 11 is a schematic diagram of a head-mounted display device according to an eighth embodiment of the disclosure.

FIG. 11 is a schematic diagram of a head-mounted display device according to an eighth embodiment of the disclosure. Referring to FIG. 11, in the embodiment, the first lens 112 is a glass aspherical lens, the second lens 114 is a plastic aspherical lens, the third lens 116 is a plastic aspherical lens, and the fourth lens 118 is a glass aspherical lens.

In the embodiment, one of the cases is that the optical lens 110 is complied with B×D<170, where B is a total lens length of the optical lens 110, and in the embodiment, B is, for example, a distance from the surface S1 to the surface S8 on the optical axis OA, and D is a clear aperture of the largest lens in the optical lens 110, and in the embodiment, D is, for example, a clear aperture of the fourth lens 118. In the embodiment, another case is that the optical lens 110 is complied with A+C<25, where A is a distance between the stop ST and the surface S1 of the optical lens 110 on the optical axis OA, i.e. a distance between the stop ST and a light exit surface of the first lens 112, and C is a distance between the surface S8 of the optical lens 110 and the surface of the image generator 150 on the optical axis OA. In the embodiment, a further case is that the optical lens 110 is complied with FOV/(B×D)>0.2, where FOV is a field of view of the optical lens 110. In the embodiment, a still another case is that the optical lens 110 is complied with FOV>40. In the embodiment, a yet another case is that the optical lens 110 is complied with B×D<170, A+C<25, FOV/(B×D)>0.2, and FOV>40 at the same time. Definitions of the above parameters A, B, C, D, FOV are the same as that described above. In the embodiment, the above parameters A, B, C, and D are, for example, respectively 5.45 mm, 8.34 mm, 5.48 mm, and 8.1 mm. The above parameters A+C, B×D, FOV/(B×D), and FOV are, for example, respectively 10.93 mm, 67.55 mm, 0.77 mm, and 48.29 mm. The values of these parameters are not intended to be limiting of the disclosure.

An embodiment of the optical lens 110 is provided below. It should be noted that the data listed below is not intended to be limiting the disclosure, and any person skilled in the art may make appropriate changes to the parameters or settings after referring to the disclosure, which are still considered to be within a scope of the disclosure.

TABLE 11

| Element | Surface | Curvature (1/mm) | Space (mm) | Refractive index | Abbe number |
|---|---|---|---|---|---|
| First lens | S1 | 0.025 | 1.46 | 1.72 | 29 |
| 112 | S2 | −0.191 | 1.43 | | |
| Second lens | S3 | −0.39 | 0.75 | 1.67 | 19 |
| 114 | S4 | −0.011 | 0.3 | | |
| Third lens | S5 | −0.076 | 2.93 | 1.53 | 56 |
| 116 | S6 | −0.351 | 0.10 | | |
| Fourth lens | S7 | 0.184 | 1.39 | 1.77 | 50 |
| 118 | S8 | 0.173 | 5.48 | | |

Referring to FIG. 11 and the Table 11, surfaces of each of the lenses (including the first lens 112 to the fourth lens 118) are listed in the Table 11. For example, the surface S1 is a surface of the first lens 112 facing the light exit side ES, and the surface S2 is a surface of the first lens 112 facing the light incident side IS, and the others may be deduced by analogy. Moreover, the space refers to a straight line distance between two adjacent surfaces on the optical axis OA. For example, the space corresponding to the surface S1 represents a straight line distance from the surface S1 to the surface S2 on the optical axis OA, and the space corresponding to the surface S2 represents a straight line distance from the surface S2 to the surface S3 on the optical axis OA, and the others may be deduced by analogy.

In the embodiment, the first lens 112, the second lens 114, the third lens 116, and the fourth lens 118 may be aspherical lenses. An equation of the aspherical lens is as follows:

$$X = \frac{Y^2}{R(1+\sqrt{1-(1+k)*Y^2/R^2})} + A_2Y^2 + A_4Y^4 + A_6Y^6 + A_8Y^8 + A_{10}Y^{10} + A_{12}Y^{12} \ldots + A_{14}Y^{14} + A_{16}Y^{16}$$

In the above equation, X is a sag in the direction of the optical axis OA, and R is a radius of an osculating sphere, i.e., a radius of curvature near the optical axis OA (a reciprocal of the curvature listed in the Table 1). k is a conic coefficient, Y is an aspheric height, i.e., a height from a lens center to a lens edge, and coefficients $A_2$, $A_4$, $A_6$, $A_8$, $A_{10}$, $A_{12}$, $A_{14}$, $A_{16}$ are aspheric coefficients. In the embodiment, the coefficient $A_2$ is 0. The following Table 12 lists parameter values of the surfaces of each of the lenses.

TABLE 12

| | S1 | S2 | S3 | S4 | S5 | S6 | S7 | S8 |
|---|---|---|---|---|---|---|---|---|
| k | 0.00E+00 | 0.00E+00 | −3.03E+00 | 9.90E+01 | 0 | −8.14E−01 | −1.09E+00 | 0 |
| A4 | 1.87E−03 | 7.47E−03 | −1.79E−03 | −5.94E−04 | 1.41E−03 | 1.79E−03 | −3.74E−03 | −8.76E−03 |
| A6 | −4.79E−04 | −5.32E−04 | 8.67E−04 | 1.95E−04 | −1.52E−04 | 2.51E−04 | 3.40E−04 | 7.81E−04 |
| A8 | 4.97E−05 | 7.84E−05 | 5.89E−06 | −1.90E−05 | 7.55E−06 | −4.56E−05 | −3.73E−05 | −7.69E−05 |
| A1 0 | 2.66E−07 | −6.19E−06 | −5.03E−05 | −7.83E−07 | 1.44E−07 | 3.48E−06 | 2.10E−06 | 5.13E−06 |
| A12 | −1.33E−06 | −6.86E−07 | 1.03E−05 | 1.23E−07 | 1.61E−08 | −1.48E−07 | −4.88E−08 | −2.20E−07 |
| A14 | 1.38E−09 | −1.57E−08 | −1.03E−06 | −3.67E−09 | 1.07E−09 | 3.16E−09 | 3.09E−10 | 6.15E−09 |
| A16 | 9.23E−09 | 7.82E−09 | 4.20E−08 | 4.68E−11 | −9.34E−11 | 7.62E−11 | 0 | −8.94E−11 |

Figure 12A:
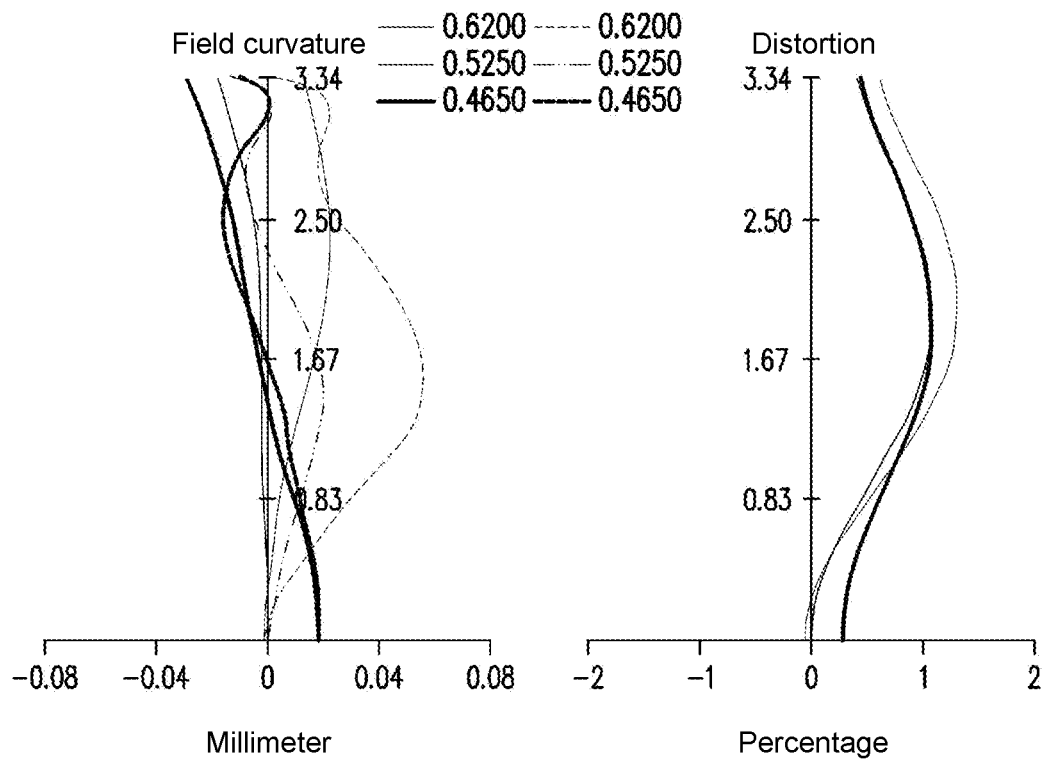
FIG. 12A is an astigmatic field curvature diagram and a distortion diagram of an optical lens of FIG. 11.
Figure 12B:
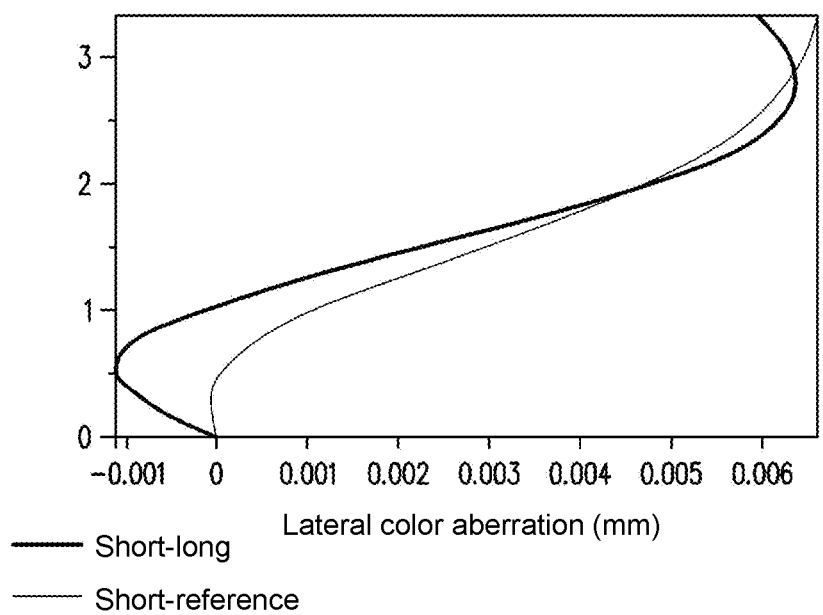
FIG. 12B is a lateral color aberration diagram of the optical lens of FIG. 11.
Figure 12C:
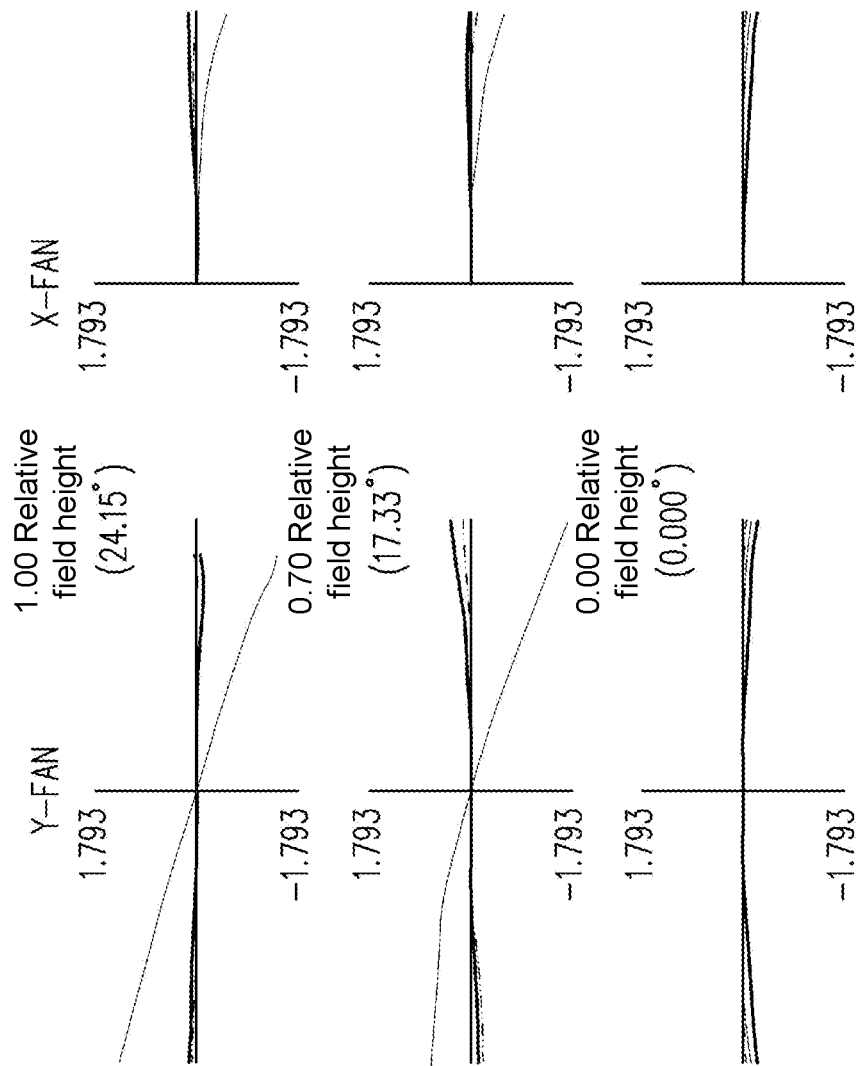
FIG. 12C is an optical path difference diagram of the optical lens of FIG. 11.
Figure 13A:
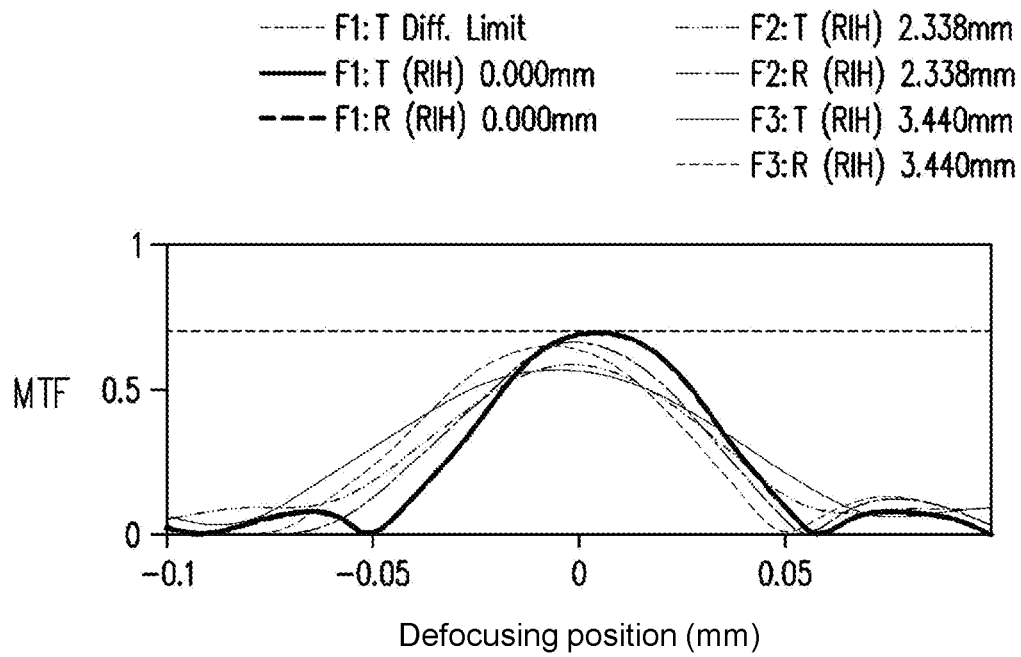
FIG. 13A, FIG. 13B, FIG. 13C and FIG. 13D are schematic diagrams respectively illustrating a modulation conversion function of thermal balance of the optical lens of the eighth embodiment at ambient temperatures of 20° C., 0° C., 25° C. and 40° C.
Figure 13B:
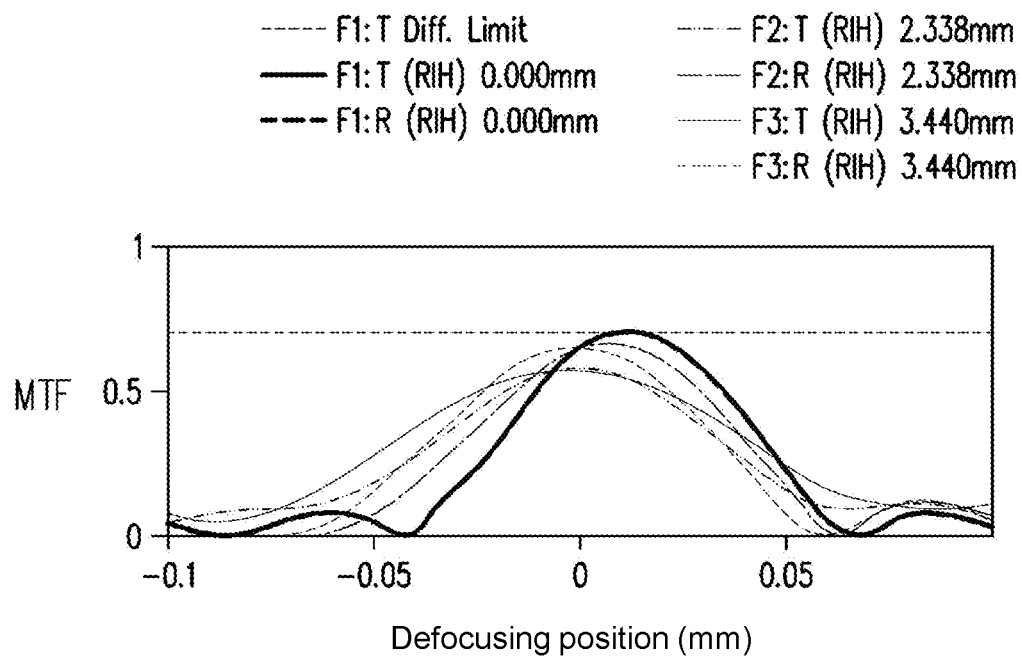
Figure 13C:
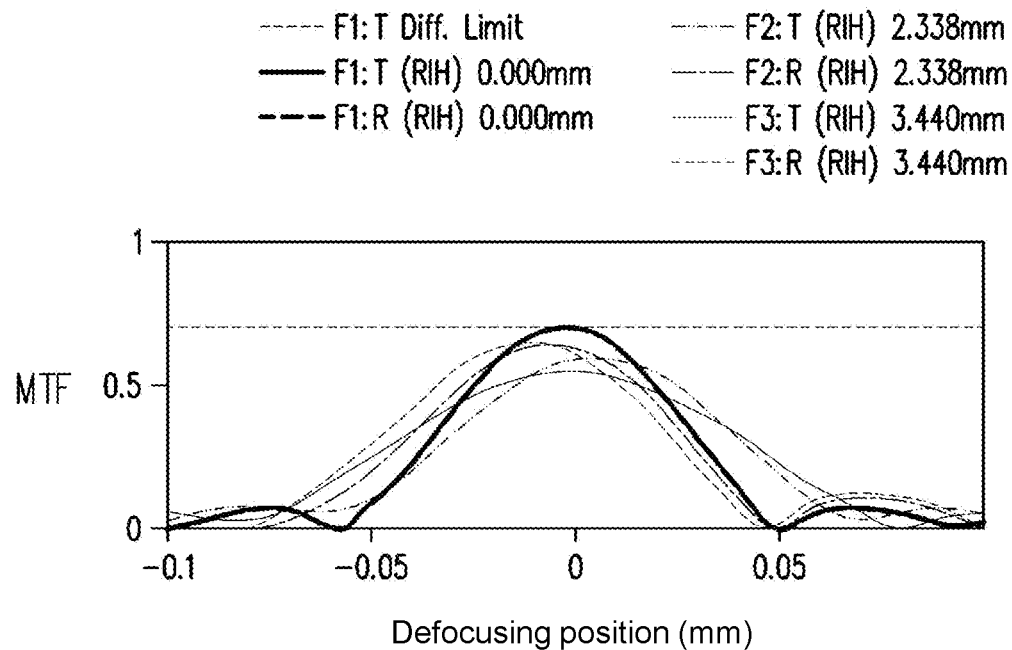
Figure 13D:
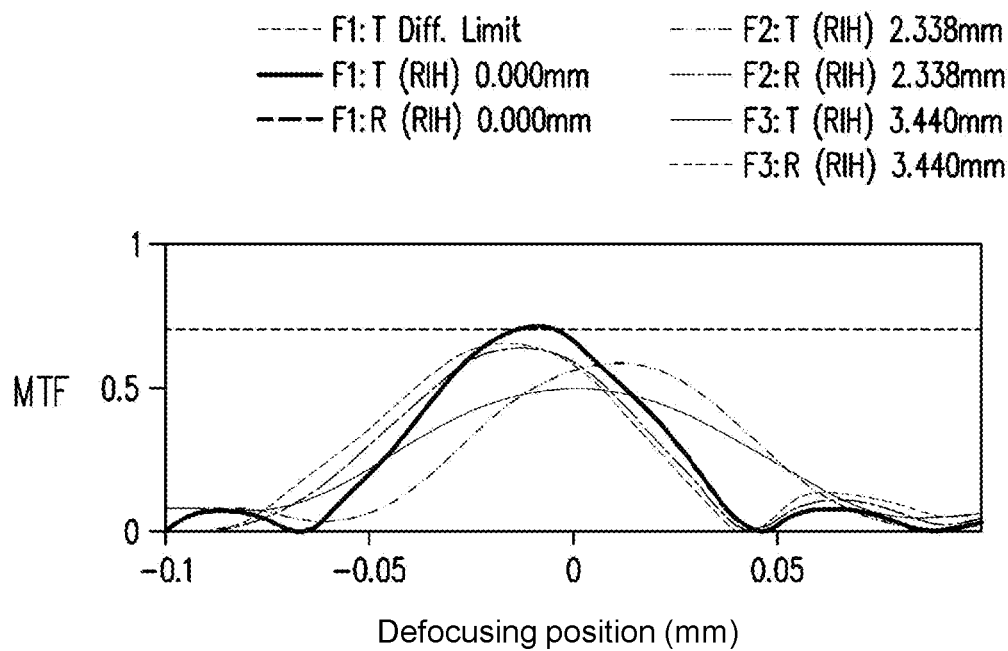

FIG. 12A is an astigmatic field curvature diagram and a distortion diagram of the optical lens of FIG. 11. FIG. 12B is a lateral color aberration diagram of the optical lens of FIG. 11, which is a simulation data diagram drawn based on light with a wavelength of 465 nm, 525 nm, and 620 nm, in which vertical coordinates represent image heights. FIG. 12C is an optical path difference diagram of the optical lens of FIG. 11. The figures shown in FIG. 12A to FIG. 12C are all within a standard range, and it is verified that the optical lens 110 of the embodiment may achieve a good imaging effect. Moreover, as shown in FIG. 12C, on an active surface of the image generator 150, an OPD range of the image beam IM is:

$$-2.0\lambda < OPD < 2.0\lambda,$$

where OPD is an optical path difference at each field of view, λ is a wavelength of each color light, and the image beam IM includes red light, green light, and blue light. The active surface of the image generator 150 is a surface from which the image beam IM exits. Further, regarding the design of the optical path difference, those skilled in the art may easily know the optical path difference of the image beam to be provided by the image source at each field of view through reverse deduction from an object plane by means of optical simulation when designing an optical lens. In the embodiment, the field of view FOV is designed and optimized to 48.29 degrees, which achieves better FOV coverage. A ratio of the field of view per unit cross-sectional area is high, and the ratio may reach 0.71 (degrees/square millimeter), so that the optical lens 110 is thinner, lighter, shorter, smaller in volume and has a higher effective spatial utilization rate. Referring to FIG. 12B to FIG. 12C, in the embodiment, the maximum image height formed on the active surface of the image generator 150 is 3.34 mm, the design of the optical lens 110 is complied with a preset specification, and the optical lens 110 may analyze images with a resolution of at least 111 lp/mm. Therefore, the optical lens 110 has a small size, a light weight, a large viewing angle and high resolution.

The framework of the optical lens of the eighth embodiment may mitigate the problem of thermal drift, which is described in detail below. FIG. 13A, FIG. 13B, FIG. 13C and FIG. 13D are schematic diagrams respectively illustrating a modulation conversion function (MTF) of thermal balance of the optical lens of the eighth embodiment at ambient temperatures of 20° C., 0° C., 25° C. and 40° C. Various optical parameters of the optical lens 110 are, for example, designed with reference of the ambient temperature of 20° C. Therefore, the MTF of thermal balance shown in FIG. 13A may be used as a reference value for determining whether the optical lens 110 generates thermal drift. According to FIG. 13B, FIG. 13C and FIG. 13D, it is known that when the ambient temperature is changed from 0° C. to 40° C., the MTF of the optical lens 110 is still greater than 45% after such thermal effect.

The following Table 13 lists lens temperatures of each of the lens (including the first lens 112 to the fourth lens 118) at different ambient temperatures.

TABLE 13

| Ambient temperature (° C.) | Lens temperature (° C.) | | | |
|---|---|---|---|---|
| | First lens | Second lens | Third lens | Fourth lens |
| 0 | 11 | 12 | 14 | 16 |
| 25 | 36 | 37 | 39 | 41 |
| 40 | 51 | 52 | 54 | 56 |

Figure 14:
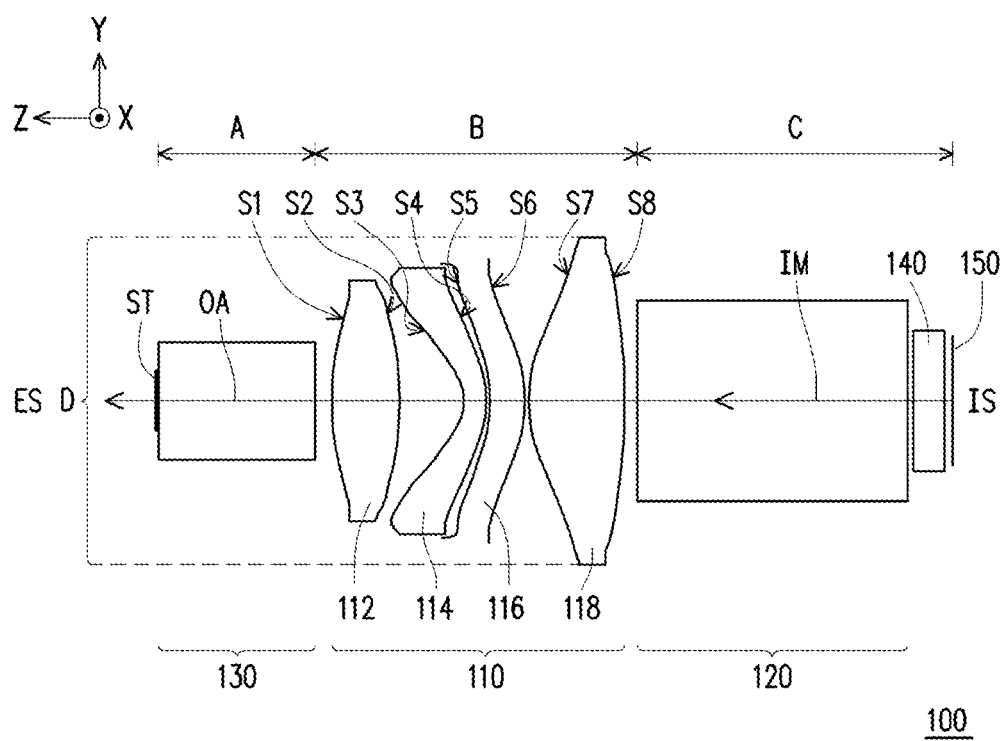
FIG. 14 is a schematic diagram of a head-mounted display device according to a ninth embodiment of the disclosure.

FIG. 14 is a schematic diagram of a head-mounted display device according to a ninth embodiment of the disclosure. Referring to FIG. 14, in the embodiment, the first lens 112 is a glass aspherical lens, the second lens 114 is a plastic aspherical lens, the third lens 116 is a glass aspherical lens, and the fourth lens 118 is a plastic aspherical lens.

In the embodiment, one of the cases is that the optical lens 110 is complied with B×D<170, where B is a total lens length of the optical lens 110, and in the embodiment, B is, for example, a distance from the surface S1 to the surface S8 on the optical axis OA, and D is a clear aperture of the largest lens in the optical lens 110, and in the embodiment, D is, for example, a clear aperture of the fourth lens 118. In the embodiment, another case is that the optical lens 110 is complied with A+C<25, where A is a distance between the stop ST and the surface S1 of the optical lens 110 on the optical axis OA, i.e. a distance between the stop ST and a light exit surface of the first lens 112, and C is a distance between the surface S8 of the optical lens 110 and the surface of the image generator 150 on the optical axis OA. In the embodiment, a further case is that the optical lens 110 is complied with FOV/(B×D)>0.2, where FOV is a field of view of the optical lens 110. In the embodiment, a still another case is that the optical lens 110 is complied with FOV>40. In the embodiment, a yet another case is that the optical lens 110 is complied with B×D<170, A+C<25, FOV/(B×D)>0.2, and FOV>40 at the same time. Definitions of the above parameters A, B, C, D, FOV are the same as that described above. In the embodiment, the above parameters A, B, C, and D are, for example, respectively 5.5 mm, 7.95 mm, 5.1 mm, and 8.1 mm. The above parameters A+C, B×D, FOV/(B×D), and FOV are, for example, respectively 10.6 mm, 64.495 mm, 0.74 mm, and 47.7 mm. The values of these parameters are not intended to be limiting of the disclosure.

An embodiment of the optical lens 110 is provided below. It should be noted that the data listed below is not intended to be limiting the disclosure, and any person skilled in the art may make appropriate changes to the parameters or settings after referring to the disclosure, which are still considered to be within a scope of the disclosure.

TABLE 14

| Element | Surface | Curvature (1/mm) | Space (mm) | Refractive index | Abbe number |
|---|---|---|---|---|---|
| First lens 112 | S1 | 0.0129 | 1.83 | 1.59 | 61 |
| | S2 | −0.121 | 1.76 | | |
| Second lens 114 | S3 | −0.911 | 0.6 | 1.64 | 22 |
| | S4 | −0.404 | 0.11 | | |
| Third lens 116 | S5 | −0.267 | 0.93 | 1.52 | 64 |
| | S6 | −0.249 | 0.10 | | |
| Fourth lens 118 | S7 | 0.348 | 2.63 | 1.53 | 56 |
| | S8 | −0.053 | 5.1 | | |

Referring to FIG. 14 and the Table 14, surfaces of each of the lenses (including the first lens 112 to the fourth lens 118) are listed in the Table 14. For example, the surface S1 is a surface of the first lens 112 facing the light exit side ES, and the surface S2 is a surface of the first lens 112 facing the light incident side IS, and the others may be deduced by analogy. Moreover, the space refers to a straight line distance between two adjacent surfaces on the optical axis OA. For example, the space corresponding to the surface S1 represents a straight line distance from the surface S1 to the surface S2 on the optical axis OA, and the space corresponding to the surface S2 represents a straight line distance from the surface S2 to the surface S3 on the optical axis OA, and the others may be deduced by analogy.

In the embodiment, the first lens 112, the second lens 114, the third lens 116, and the fourth lens 118 may be aspherical lenses. An equation of the aspherical lens is as follows:

$$X = \frac{Y^2}{R(1 + \sqrt{1 - (1+k) * Y^2/R^2})} + A_2 Y^2 + A_4 Y^4 + A_6 Y^6 + A_8 Y^8 + A_{10} Y^{10} + A_{12} Y^{12} \ldots + A_{14} Y^{14} + A_{16} Y^{16}$$

In the above equation, X is a sag in the direction of the optical axis OA, and R is a radius of an osculating sphere, i.e., a radius of curvature near the optical axis OA (a reciprocal of the curvature listed in the Table 1). k is a conic coefficient, Y is an aspheric height, i.e., a height from a lens center to a lens edge, and coefficients $A_2$, $A_4$, $A_6$, $A_8$, $A_{10}$, $A_{12}$, $A_{14}$, $A_{16}$ are aspheric coefficients. In the embodiment, the coefficient $A_2$ is 0. The following Table 15 lists parameter values of the surfaces of each of the lenses.

Figure 15A:
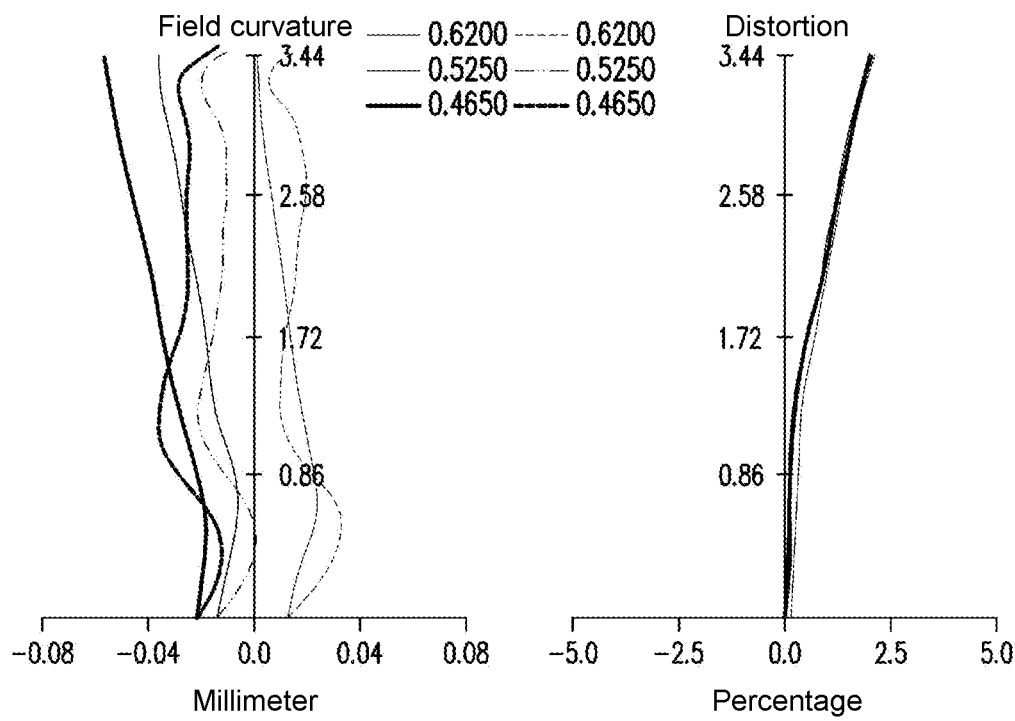
FIG. 15A is an astigmatic field curvature diagram and a distortion diagram of an optical lens of FIG. 14.
Figure 15B:
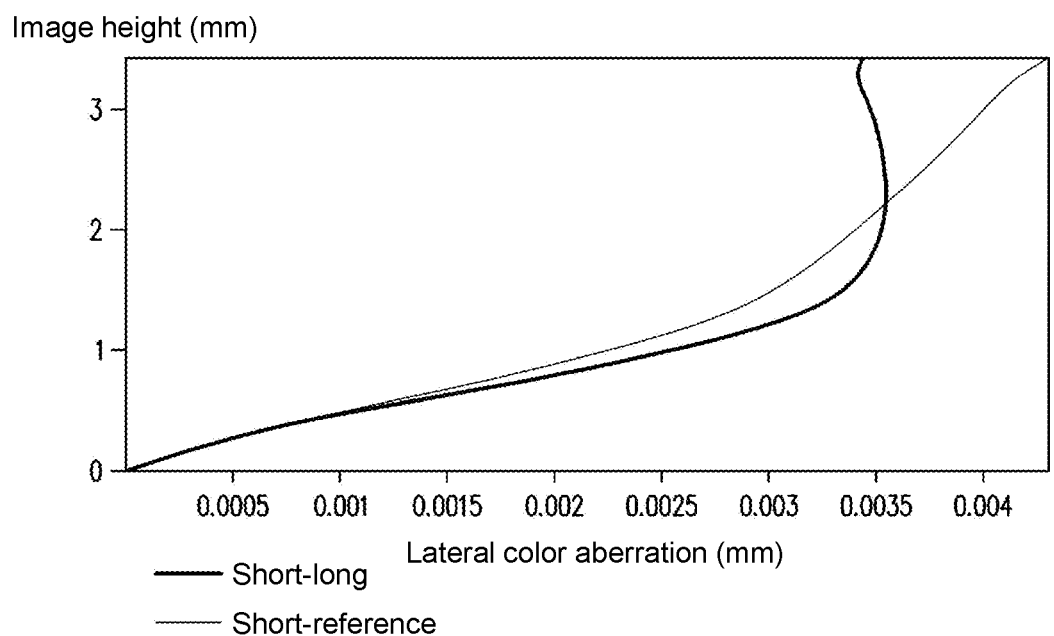
FIG. 15B is a lateral color aberration diagram of the optical lens of FIG. 14.
Figure 15C:
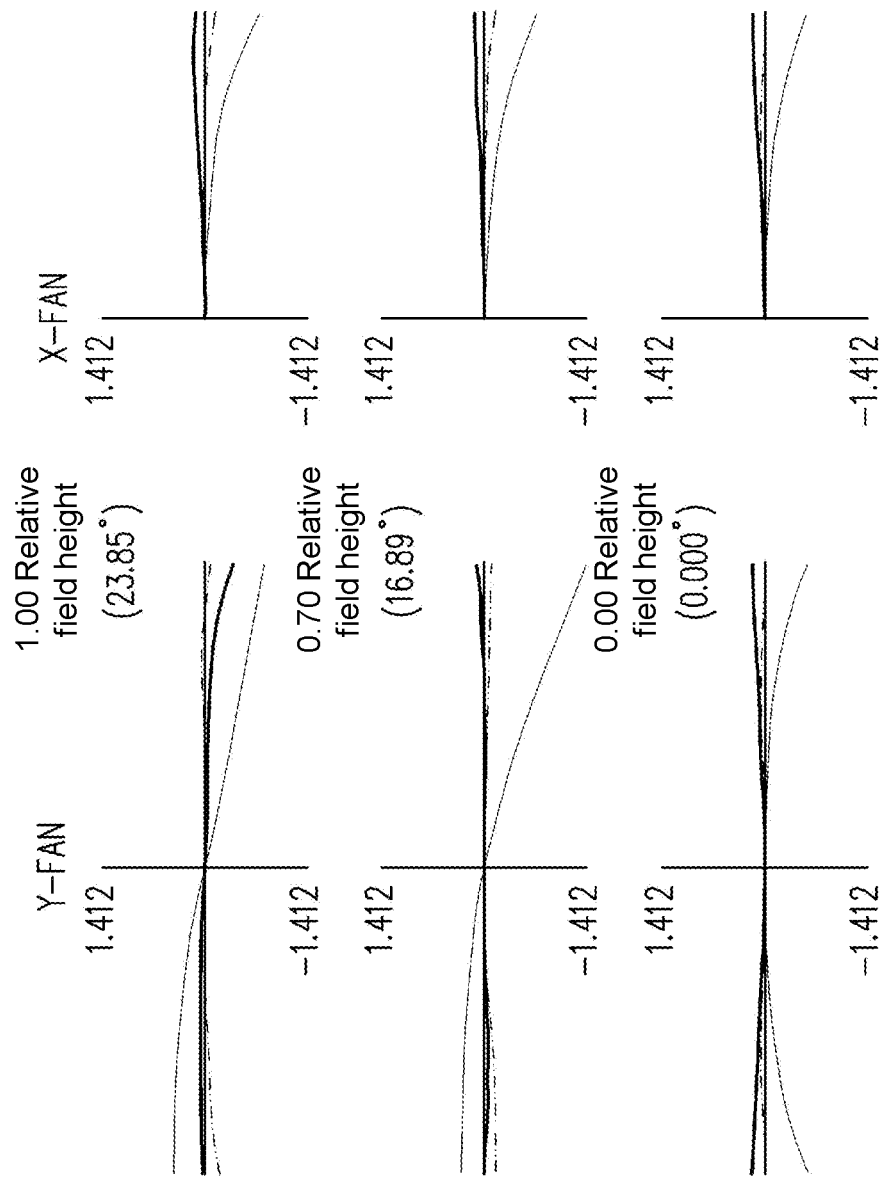
FIG. 15C is an optical path difference diagram of the optical lens of FIG. 14.
Figure 16A:
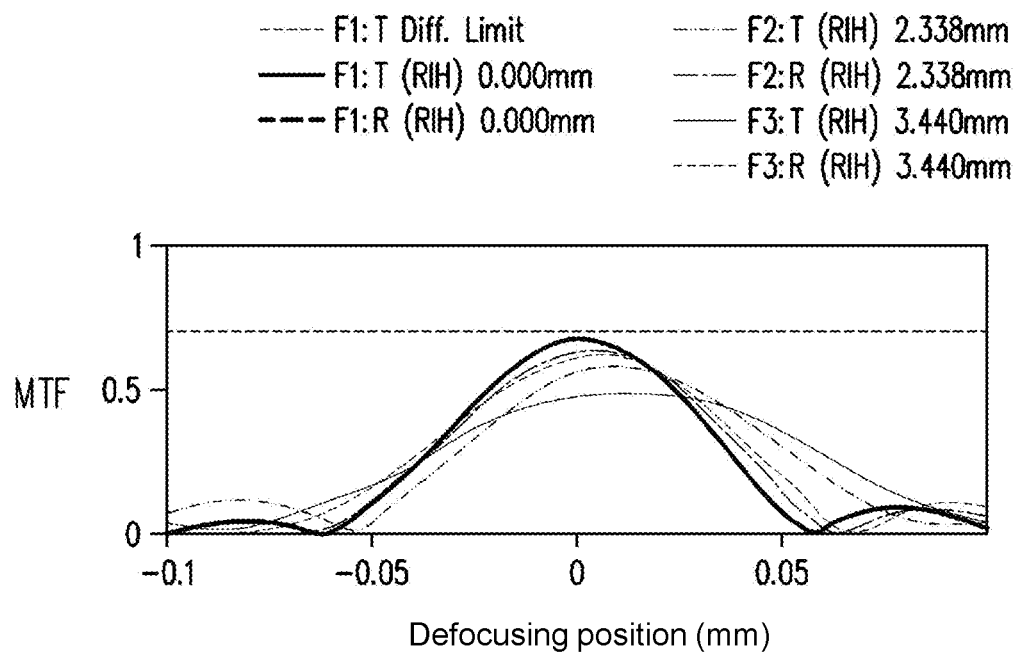
FIG. 16A, FIG. 16B, FIG. 16C and FIG. 16D are schematic diagrams respectively illustrating a modulation conversion function of thermal balance of the optical lens of the ninth embodiment at ambient temperatures of 20° C., 0° C., 25° C. and 40° C.
Figure 16B:
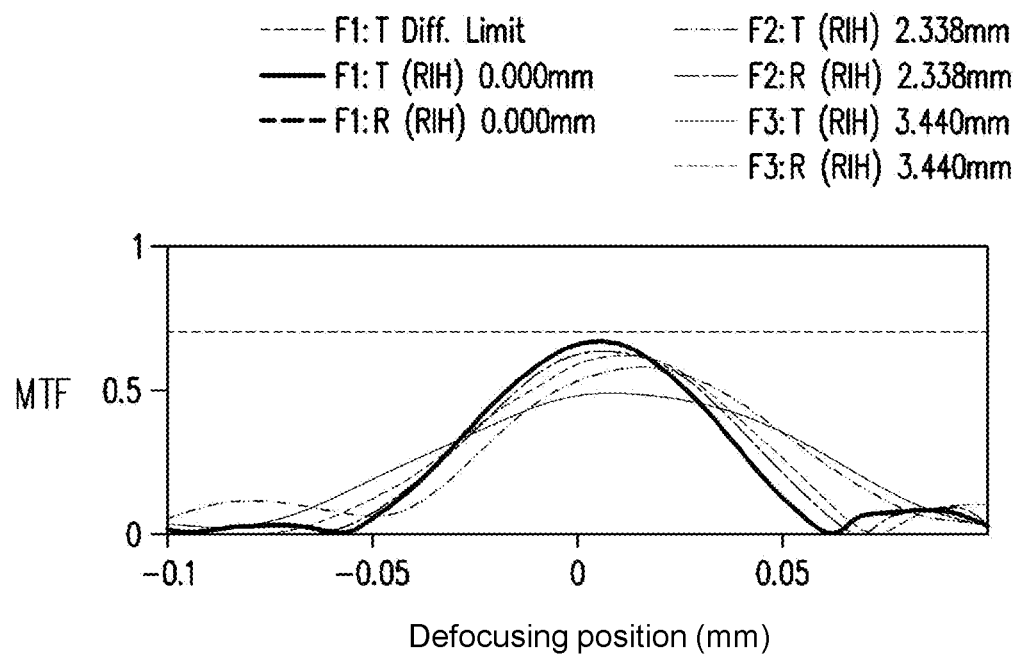
Figure 16C:
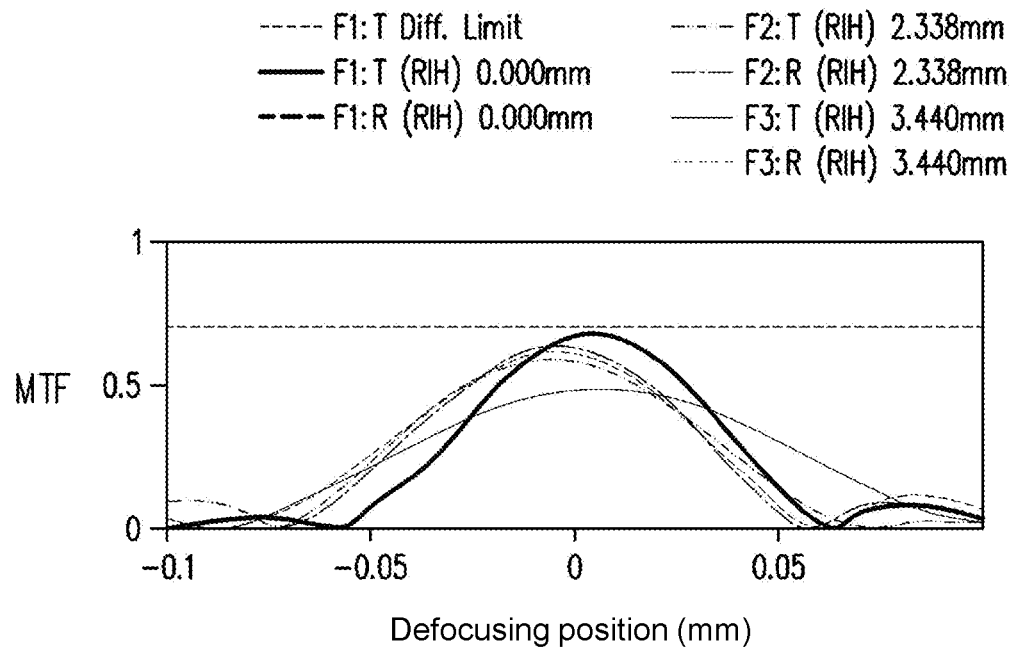
Figure 16D:
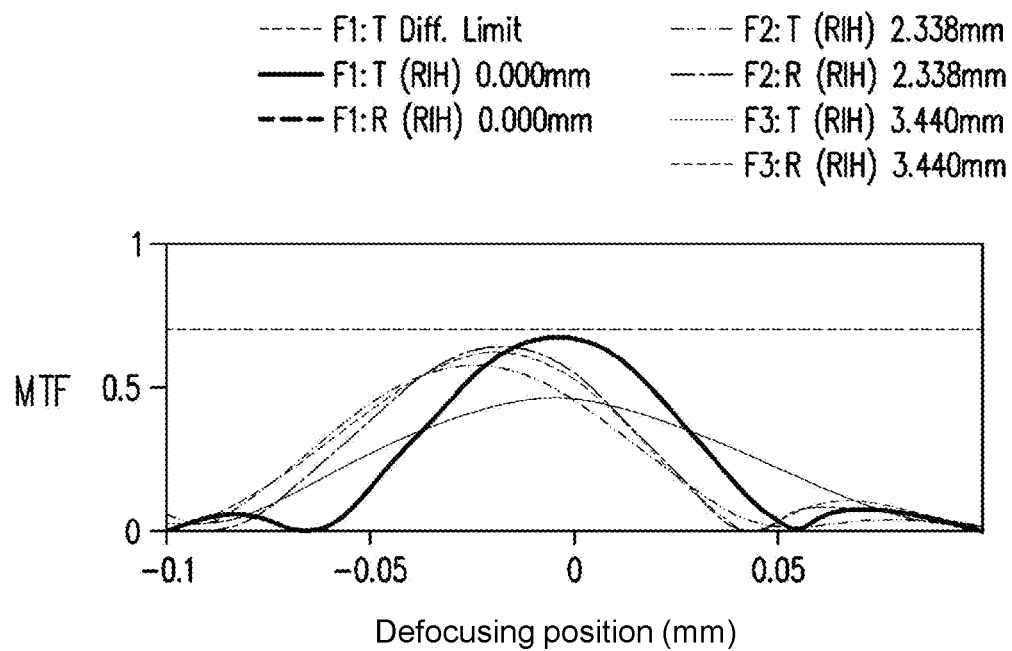

15C is an optical path difference diagram of the optical lens of FIG. 14. The figures shown in FIG. 15A to FIG. 15C are all within a standard range, and it is verified that the optical lens 110 of the embodiment may achieve a good imaging effect. Moreover, as shown in FIG. 15C, on an active surface of the image generator 150, an OPD range of the image beam IM is: −2.0λ<OPD<2.0λ, where OPD is an optical path difference at each field of view, λ is a wavelength of each color light, and the image beam IM includes red light, green light, and blue light. The active surface of the image generator 150 is a surface from which the image beam IM exits. Further, regarding the design of the optical path difference, those skilled in the art may easily know the optical path difference of the image beam to be provided by the image source at each field of view through reverse deduction from an object plane by means of optical simulation when designing an optical lens. In the embodiment, the field of view FOV is designed and optimized to 47.7 degrees of FOV, which achieves better FOV coverage. A ratio of the field of view per unit cross-sectional area is high, and the ratio may reach 0.74 (degrees/square millimeter), so that the optical lens 110 is thinner, lighter, shorter, smaller in volume and has a higher effective spatial utilization rate. Referring to FIG. 15B to FIG. 15C, in the embodiment, the maximum image height formed on the active surface of the image generator 150 is 3.34 mm, the design of the optical lens 110 is complied with a preset specification, and the optical lens 110 may analyze images with a resolution of at least 111 lp/mm. Therefore, the optical lens 110 has a small size, a light weight, a large viewing angle and high resolution.

The framework of the optical lens of the ninth embodiment may mitigate the problem of thermal drift, which is described in detail below. FIG. 16A, FIG. 16B, FIG. 16C and FIG. 16D are schematic diagrams respectively illustrating a modulation conversion function (MTF) of thermal balance of the optical lens of the ninth embodiment at ambient temperatures of 20° C., 0° C., 25° C. and 40° C. Various optical parameters of the optical lens 110 are, for example, designed with reference of the ambient temperature of 20° C. Therefore, the MTF of thermal balance shown in FIG. 16A may be used as a reference value for determining whether the optical lens 110 generates thermal drift. According to FIG. 16B, FIG. 16C and FIG. 16D, it is known that when the ambient temperature is changed from 0° C. to

TABLE 15

| | S1 | S2 | S3 | S4 | S5 | S6 | S7 | S8 |
|---|---|---|---|---|---|---|---|---|
| k | 0 | 0 | −2.19E+00 | −5.61E+00 | 0 | −1.29E+00 | −5.22E+00 | 0 |
| A4 | 2.03E−04 | 1.42E−03 | −6.57E−03 | −3.21E−03 | 8.74E−03 | 8.31E−04 | −8.28E−04 | −1.54E−03 |
| A6 | −6.28E−05 | −2.34E−04 | 9.98E−04 | 4.24E−04 | −1.50E−04 | 4.19E−04 | 2.66E−04 | 5.48E−04 |
| A8 | −9.31E−06 | 2.31E−05 | 1.22E−04 | −1.36E−05 | 5.20E−06 | −5.01E−05 | −3.95E−05 | −8.08E−05 |
| A10 | −4.90E−07 | −1.26E−06 | −3.72E−05 | −9.18E−07 | 3.49E−07 | 4.18E−06 | 2.26E−06 | 5.90E−06 |
| A12 | 0 | 0 | 4.19E−06 | 8.44E−08 | 7.59E−08 | −8.29E−08 | −3.04E−08 | −2.23E−07 |
| A14 | 0 | 0 | −2.64E−07 | −1.09E−09 | −9.73E−09 | −3.21E−09 | −2.15E−09 | 3.39E−09 |
| A16 | 0 | 0 | 7.88E−09 | 1.22E−10 | 0 | 0 | 7.25E−11 | 7.53E−12 |

FIG. 15A is an astigmatic field curvature diagram and a distortion diagram of the optical lens of FIG. 14. FIG. 15B is a lateral color aberration diagram of the optical lens of FIG. 14, which is a simulation data diagram drawn based on light with a wavelength of 465 nm, 525 nm, and 620 nm, in which vertical coordinates represent image heights. FIG.

40° C., the MTF of the optical lens 110 is still greater than 40% after such thermal effect.

The following Table 16 lists lens temperatures of each of the lens (including the first lens 112 to the fourth lens 118) at different ambient temperatures.

TABLE 16

| Ambient temperature (° C.) | Lens temperature (° C.) | | | |
|---|---|---|---|---|
| | First lens | Second lens | Third lens | Fourth lens |
| 0 | 11 | 12 | 14 | 16 |
| 25 | 36 | 37 | 39 | 41 |
| 40 | 51 | 52 | 54 | 56 |

According to the above description, it is known that the thermal drift of the back focal length (BFL) of the framework of the optical lens of the seventh to ninth embodiments is less than 0.015 mm, which mitigates the problem of thermal drift.

In summary, the fourth to ninth embodiments of the disclosure have at least one of following advantages or effects. In the exemplary embodiments of the disclosure, the design of the optical lens is complied with the preset specification, so that the optical lens of the disclosure has a small size, a light weight, a large viewing angle and high resolution and may mitigate the problem of thermal drift.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. An optical lens, adapted to receive an image beam from an image generator, wherein a prism is disposed between the optical lens and the image generator, the optical lens comprising:
    a first lens, a second lens, a third lens, and a fourth lens sequentially arranged from a light exit side to a light incident side, and refractive powers of the first lens, the second lens, the third lens, and the fourth lens being sequentially positive, negative, positive, and positive, wherein the image generator is disposed at the light incident side, the image beam forms a stop at the light exit side, and the stop has the minimum cross-sectional area of beam convergence of the image beam,
    wherein the prism does not have a refractive power and is configured to guide the image beam from the image generator to the fourth lens, and the image beam is directly incident onto the fourth lens after the image beam leaves from the prism,
    wherein the fourth lens is a concavo-convex lens and has a concave surface facing the light incident side,
    wherein the first lens is a biconvex lens, the second lens is a convexo-concave lens and has a convex surface facing the light incident side, the third lens is a biconvex lens.

2. The optical lens of claim 1, wherein the optical lens is complied with B×D<130, wherein B is a total lens length of the optical lens, and D is a clear aperture of the largest lens in the optical lens.

3. The optical lens of claim 1, wherein the optical lens is complied with A+C<20, wherein A is a distance between the stop and the optical lens on an optical axis, and C is a distance between the optical lens and the image generator on the optical axis.

4. The optical lens of claim 1, wherein the optical lens is complied with FOV/(B×D)>0.4, wherein B is a total lens length of the optical lens, D is a clear aperture of the largest lens in the optical lens, and FOV is a field of view of the optical lens.

5. The optical lens of claim 1, wherein the optical lens is complied with FOV>50, wherein FOV is a field of view of the optical lens.

6. The optical lens of claim 1, wherein the first lens, the second lens, the third lens and the fourth lens are glass aspherical lenses.

7. The optical lens of claim 1, wherein the optical lens is complied with A+C<25, wherein A is a distance between the stop and the optical lens on an optical axis, and C is a distance between the optical lens and the image generator on the optical axis.

8. The optical lens of claim 1, wherein the optical lens is complied with FOV/(B×D)>0.2, wherein B is a total lens length of the optical lens, D is a clear aperture of the largest lens in the optical lens, and FOV is a field of view of the optical lens.

9. The optical lens of claim 1, wherein the optical lens is complied with FOV>40, wherein FOV is a field of view of the optical lens.

10. The optical lens of claim 1, wherein the first lens and the second lens are plastic aspherical lenses, and the third lens and the fourth lens are glass aspherical lenses.

11. The optical lens of claim 1, wherein the second lens and the third lens are plastic aspherical lenses, and the first lens and the fourth lens are glass aspherical lenses.

12. The optical lens of claim 1, wherein the second lens and the fourth lens are plastic aspherical lenses, and the first lens and the third lens are glass aspherical lenses.

13. The optical lens of claim 1, wherein the first lens, the second lens and the third lens are plastic aspherical lenses, and the fourth lens is a glass aspherical lens.

14. The optical lens of claim 1, further comprising a first prism disposed between the optical lens and the stop, wherein the image beam leaves the optical lens, passes through the first prism, and is converged to the stop, and the image beam is diverged after passing through the stop.

15. The optical lens of claim 1, wherein the stop is formed at a coupling entrance of a waveguide element, the image beam passes through the stop and enters the waveguide element through the coupling entrance, and is transmitted to a coupling exit of the waveguide element for being projected to a target.

16. The optical lens of claim 1, wherein the optical lens is complied with following conditions:

$B \times D < 130,$ $A + C < 20,$ $FOV/(B \times D) > 0.4,$ $FOV > 50,$ wherein A is a distance between the stop and the optical lens on an optical axis, B is a total lens length of the optical lens, C is a distance between the optical lens and the image generator on the optical axis, D is a clear aperture of the largest lens in the optical lens, and FOV is a field of view of the optical lens, wherein a shape of the stop is a circle.

17. The optical lens of claim 1, wherein the optical lens is complied with following conditions:

$B \times D < 170,$ $A + C < 25,$ $FOV/(B \times D) > 0.2,$ $FOV > 40,$ wherein A is a distance between the stop and the optical lens on an optical axis, B is a total lens length of the optical lens, C is a distance between the optical lens and the image generator on the optical axis, D is a clear aperture of the largest lens in the optical lens, and FOV is a field of view of the optical lens, wherein a shape of the stop is a circle.

18. The optical lens of claim 1, wherein the optical lens is complied with $B \times D < 170$, wherein B is a total lens length of the optical lens, and D is a clear aperture of the largest lens in the optical lens.

19. A head-mounted display device, comprising:
an image generator;
an optical lens, comprising a first lens, a second lens, a third lens, and a fourth lens sequentially arranged from a light exit side to a light incident side, and refractive powers of the first lens, the second lens, the third lens, and the fourth lens being sequentially positive, negative, positive, and positive, wherein the first lens is a biconvex lens, the second lens is a convexo-concave lens and has a convex surface facing the light incident side, the third lens is a biconvex lens, wherein the image generator is set at the light incident side, and the optical lens is configured to receive an image beam provided by the image generator, the image beam forms a stop at the light exit side, and the stop has the minimum cross-sectional area of beam convergence of the image beam; a prism, disposed between the optical lens and the image generator, wherein the prism does not have a refractive power and is configured to guide the image beam from the image generator to the fourth lens, and the image beam is directly incident onto the fourth lens after the image beam leaves from the prism, wherein the fourth lens is a concavo-convex lens and has a concave surface facing the light incident side; and
a waveguide element, wherein the stop is formed at a coupling entrance of the waveguide element, the image beam passes through the stop to enter the waveguide element through the coupling entrance, and is transmitted to a coupling exit of the waveguide element for being projected to a target.

20. The head-mounted display device of claim 19, further comprising: a first prism disposed between the optical lens and the stop, wherein the image beam leaves the optical lens, passes through the first prism, and is converged to the stop, and the image beam is diverged after passing through the stop.

21. The head-mounted display device of claim 19, wherein the waveguide element comprises optical microstructures disposed at the coupling exit, and the optical microstructures project the image beam transmitted to the coupling exit to the target.

* * * * *